US012602988B2

(12) United States Patent
Garrick et al.

(10) Patent No.: US 12,602,988 B2
(45) Date of Patent: Apr. 14, 2026

(54) TESTING OF DETECTION AND WARNING FUNCTIONS OF INTERCONNECTED SMOKE, HEAT AND CARBON MONOXIDE ALARMS BY SINGLE PERSON

(71) Applicants: Gilbert Alain Lindsay Garrick, Red Hill (AU); John Wayne Stephens, Red Hill (AU); David Warwick Sloan, Red Hill (AU)

(72) Inventors: Gilbert Alain Lindsay Garrick, Red Hill (AU); John Wayne Stephens, Red Hill (AU); David Warwick Sloan, Red Hill (AU)

( * ) Notice: Subject to any disclaimer, the term of this patent is extended or adjusted under 35 U.S.C. 154(b) by 66 days.

(21) Appl. No.: 18/293,072

(22) PCT Filed: Jul. 29, 2022

(86) PCT No.: PCT/AU2022/050806
§ 371 (c)(1),
(2) Date: Jan. 29, 2024

(87) PCT Pub. No.: WO2023/004470
PCT Pub. Date: Feb. 2, 2023

(65) Prior Publication Data
US 2024/0386790 A1 Nov. 21, 2024

(30) Foreign Application Priority Data
Jul. 29, 2021 (AU) ................................ 2021902341

(51) Int. Cl.
*G08B 29/14* (2006.01)
*G08B 17/06* (2006.01)

(52) U.S. Cl.
CPC .......... *G08B 29/145* (2013.01); *G08B 17/06* (2013.01)

(58) Field of Classification Search
CPC ............................ G08B 29/145; G08B 17/06
See application file for complete search history.

(56) References Cited

U.S. PATENT DOCUMENTS 6,437,698 B1 8/2002 Byrne et al.
6,624,750 B1 9/2003 Marman et al.
(Continued)

FOREIGN PATENT DOCUMENTS

GB 2 423 397 A 8/2006
JP 2001175978 A 6/2001
WO 2021/026584 A1 2/2021

OTHER PUBLICATIONS

Australian Patent Office, International Preliminary Report on Patentability issued Nov. 3, 2023, which pertains to Australian PCT Application No. PCT/AU2022/050806. 8 pgs.
(Continued)

*Primary Examiner* — Curtis A Kuntz
*Assistant Examiner* — James E Munion
(74) *Attorney, Agent, or Firm* — Thompson Hine LLP

(57) ABSTRACT

A method for a single person to fully test the smoke, heat, or carbon monoxide detection and warning functions of each alarm device of an interconnected fire alarm system comprising of two or more compatible interconnected alarm devices such as smoke alarms, heat alarms, or carbon monoxide alarms in any combination and with interconnections and power supplies of any type, the system including interconnected alarm devices with ON and OFF test switches instead of momentary action test switches, and the smoke, heat, or carbon monoxide detection and warning functions of each of the system's interconnected alarm devices are tested by a number of actions and verifications by a single person.

9 Claims, 29 Drawing Sheets

(56) References Cited

U.S. PATENT DOCUMENTS

| | | | | |
|---|---|---|---|---|
| 2002/0101344 | A1 | 8/2002 | Tanguay | |
| 2006/0082452 | A1* | 4/2006 | Kaiser | G08B 17/00 340/506 |
| 2008/0291036 | A1* | 11/2008 | Richmond | G08B 19/005 340/628 |
| 2009/0128353 | A1 | 5/2009 | Gonzales | |
| 2013/0001022 | A1 | 1/2013 | Marien et al. | |
| 2016/0343227 | A1 | 11/2016 | Shih et al. | |
| 2020/0019287 | A1 | 1/2020 | Sahai et al. | |

OTHER PUBLICATIONS

European Patent Office, Partial Supplementary European Search Report issued Dec. 9, 2024, which pertains to European Patent Application No. 22847727.9. 17 pages.

Canadian Intellectual Property Office, Office Action issued Feb. 21, 2025, which pertains to Canadian Patent Application No. 3,227,371. 4 pages.

European Patent Office, Extended European Search Report issued Mar. 3, 2025, which pertains to European Patent Application No. 22847727.9. 14 pages.

* cited by examiner

THIS DRAWING IS IN ACCORDANCE WITH THE ALLEGRO MICROSYSTEMS LLC PUBLICATION 26110.3 REV. 4 AND SHOWS THE TYPICAL APPLICATION OF THE A5348 LOW CURRENT BiCMOS INTEGRATED CIRCUIT FOR AN IONIZATION SMOKE DETECTOR WITH INTERCONNECT AND TIMER

CABLE 1 - 3-CORE CABLE TO SMOKE ALARM SA1 (+VE SA / -VE / + VE (REL))
CABLE 2 - 3-CORE CABLE TO SMOKE ALARM SA2 (+VE SA / -VE / +VE (REL))
CABLE 3 - 3-CORE CABLE TO SMOKE ALARM SA3 (+VE SA / -VE / +VE (REL))
CABLE 4 - 2-CORE POWER CABLE FROM DC POWER SUPPLY WITH STANDBY BATTERY AND BATTERY CHARGER
CABLE 5 - 2-CORE + EARTH MAINS SUPPLY CABLE (ACTIVE / NEUTRAL / EARTH)

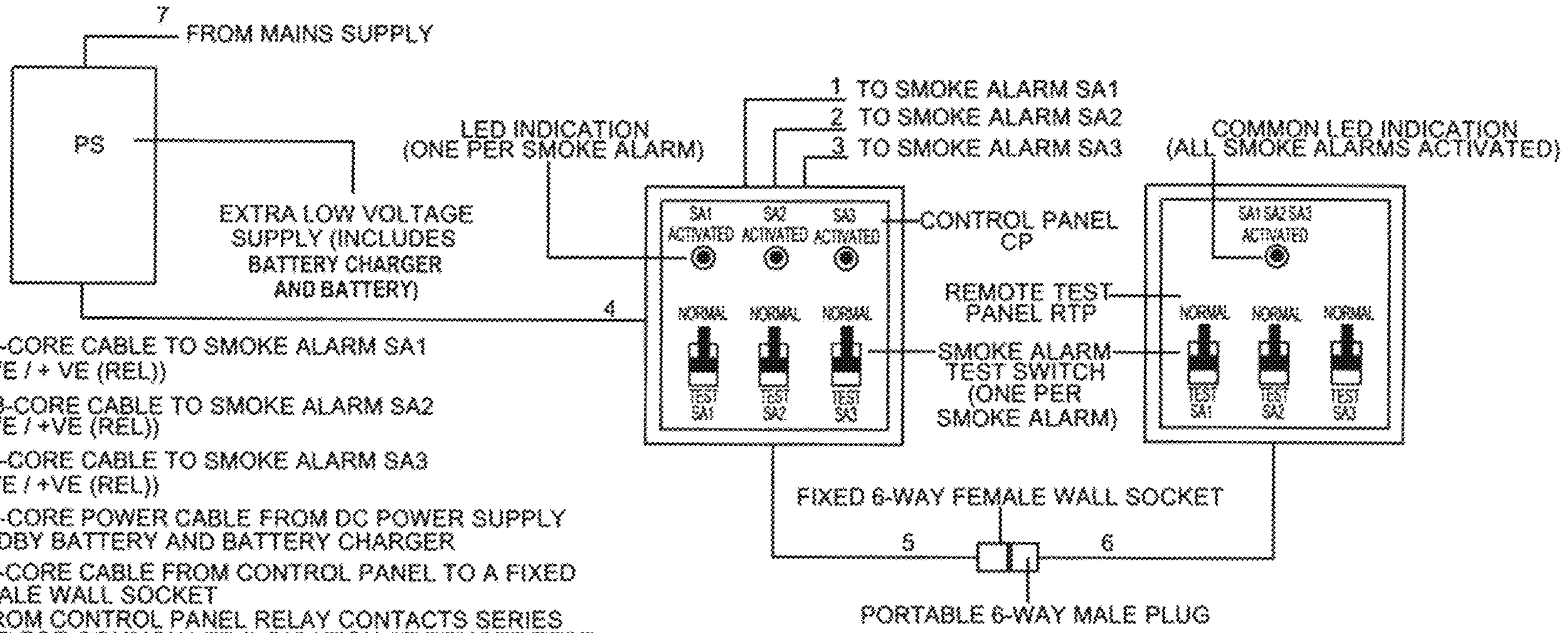

CABLE 1 - 3-CORE CABLE TO SMOKE ALARM SA1
(+VE SA / -VE / + VE (REL))

CABLE 2 - 3-CORE CABLE TO SMOKE ALARM SA2
(+VE SA / -VE / +VE (REL))

CABLE 3 - 3-CORE CABLE TO SMOKE ALARM SA3
(+VE SA / -VE / +VE (REL))

CABLE 4 - 2-CORE POWER CABLE FROM DC POWER SUPPLY
WITH STANDBY BATTERY AND BATTERY CHARGER

CABLE 5 - 6-CORE CABLE FROM CONTROL PANEL TO A FIXED
6-WAY FEMALE WALL SOCKET
CORE 1 - FROM CONTROL PANEL RELAY CONTACTS SERIES
CONNECTED FOR COMMON LED INDICATION AT REMOTE TEST
PANEL WHEN ALL SMOKE ALARMS ARE ACTIVATED
CORE 2 - SECOND REMOTE TEST SWITCH FOR SMOKE ALARM SA1
CORE 3 - SECOND REMOTE TEST SWITCH FOR SMOKE ALARM SA2
CORE 4 - SECOND REMOTE TEST SWITCH FOR SMOKE ALARM SA3
CORE 5 - + VE POWER SUPPLY FROM CONTROL PANEL
CORE 6 - NOT USED

CABLE 6 - 6-CORE CABLE FROM PORTABLE REMOTE TEST PANEL
TO A 6-WAY MALE PLUG
CORE 1 - FROM CONTROL PANEL RELAY CONTACTS SERIES
CONNECTED FOR COMMON LED INDICATION AT REMOTE TEST PANEL
WHEN ALL SMOKE ALARMS ARE ACTIVATED
CORE 2 - SECOND REMOTE TEST SWITCH FOR SMOKE ALARM SA1
CORE 3 - SECOND REMOTE TEST SWITCH FOR SMOKE ALARM SA2
CORE 4 - SECOND REMOTE TEST SWITCH FOR SMOKE ALARM SA3
CORE 5 - + VE POWER SUPPLY FROM CONTROL PANEL
CORE 6 - NOT USED
CABLE 7 - 2CORE + EARTH MAINS SUPPLY CABLE
(ACTIVE / NEUTRAL / EARTH)

FIG 26

TESTING OF DETECTION AND WARNING FUNCTIONS OF INTERCONNECTED SMOKE, HEAT AND CARBON MONOXIDE ALARMS BY SINGLE PERSON

This application is a national stage filing of International (PCT) Application No. PCT/AU2022/050806, corresponding to International Publication No. WO 2023/004470 issued Feb. 2, 2023 which claims priority to Australian Application No. 2021902341, filed Jul. 29, 2021. The entire contents of both applications are hereby incorporated by reference.

TECHNICAL FIELD

This invention relates to hard wired as well as wireless interconnected smoke, heat and carbon monoxide alarm systems and to methods for one person to reliably test the detection and warning functions of such systems.

BACKGROUND

Requirements for Smoke, Heat and Carbon Monoxide Alarms.

In Australia, the National Construction Code (NCC) mandates for all States and Territories that whenever multiple smoke alarms are used for the protection of residential dwellings, the smoke alarms must be interconnected for common alarm communication between all interconnected smoke alarms whenever smoke is detected by any one or more of the interconnected smoke alarms. The National Construction Code (NCC) also recognises that some areas may not be suitable for the installation of smoke alarms, for example in kitchens, in which case another type of alarm device, such as a heat alarm, would be appropriate for meeting the requirements of the National Construction Code (NCC). Where smoke alarms are used in conjunction with one or more heat alarms to meet the requirements of the National Construction Code, the smoke and heat alarms must all be interconnected.

It is also well known that, where fuel-burning heating appliances such as fireplaces and gas heaters are used, improper installation or poor maintenance of these appliances can result in the build-up of carbon monoxide gas in the home. For this reason, more and more homes in Australia now have carbon monoxide alarms installed although the requirement for carbon monoxide alarms in the home is not mandated by the National Construction Code (NCC). Manufacturers are also now offering interconnected carbon monoxide alarms which are compatible with their range of smoke and heat alarms so that the smoke, heat and carbon monoxide alarms can all be interconnected in the home as part of one system.

Although carbon monoxide alarms are not mandated in Australia, their use is common overseas, and for example, carbon monoxide alarms are mandated in most states in the United States of America (USA).

Because interconnected smoke, heat and carbon monoxide alarms provide a higher level of fire and occupant safety and protection, the interconnection of alarm devices for the protection of dwellings is being adopted by more and more countries around the world.

With hard wired smoke, heat and carbon monoxide alarms, the interconnection of the alarm devices is achieved by the provision of one or more dedicated conductors providing a signal path between all interconnected smoke, heat and carbon monoxide alarms so that, if any one of the smoke, heat or carbon monoxide alarm devices detects smoke, heat or carbon monoxide respectively, the alarm device activates to provide an audible fire warning. At the same time, the activated alarm device provides a signal which is applied to all the remaining interconnected smoke, heat or carbon monoxide alarms via the interconnection wiring. This signal causes all the remaining interconnected smoke, heat or carbon monoxide alarms to also activate so that they also each provide an audible fire warning to warn occupants of the protected dwelling of a fire or of the presence of carbon monoxide gas build up.

In the case of wireless interconnected smoke, heat, or carbon monoxide alarms, the signal path between all interconnected smoke, heat or carbon monoxide alarms is by wireless means such as a Radio Frequency (RF) signal transmission. The operation of wireless interconnected smoke, heat, or carbon monoxide alarms is the same as for hard wired interconnected smoke alarms except that no hard wiring is required for common alarm communication between the interconnected smoke, heat and carbon monoxide alarms.

Types of Smoke, Heat, Carbon Monoxide and Other Alarms

Single Supply Battery Operated Standalone Smoke Alarms—not Interconnected

Battery operated standalone smoke alarms are well known and are readily available at retail outlets and hardware stores and include a single non-rechargeable battery power supply. The latter can be a 9V battery which is normally required to be replaced every year, or a 10-year life battery which is expected to last the full life of the smoke alarm and is not usually user replaceable.

The smoke alarms can be tested by operating a test facility to either mechanically or electrically simulate the presence of smoke in the smoke alarm sensing assembly. When successfully tested, the smoke alarm provides an audible fire warning which is the same warning that the smoke alarm would normally provide if it detects smoke.

SUMMARY

In general, one innovative aspect of the subject matter described in this specification can be embodied in an interconnected fire alarm system that includes a method for a single person to test the smoke, heat, or carbon monoxide warning functions of each alarm device of an interconnected fire alarm system that enables the person to ascertain, at the location of an alarm device being tested, that all the system's remaining interconnected alarm devices have activated. The system may include two or more compatible interconnected alarm devices with momentary action test switches such as smoke, heat and carbon monoxide alarms in any combination. The interconnected alarm devices are hard wired to a power source and are interconnected by hard wiring or by wireless means. Each interconnected alarm device having means for detecting that the alarm device has activated and is providing an audible fire warning, such as when the alarm device is tested or is in alarm mode, each of the interconnected alarm device also having switching means which operates when it is detected that the alarm device has activated and is providing an audible fire warning, and separate signal hard wiring means connecting all of the system's interconnected alarm devices. Each of the interconnected alarm devices having further indicating means, such as a light emitting diode, connected to the said separate signal wiring means so that the said indicating means of all of the interconnected alarm devices are switched on by said switching means to provide an indication at each interconnected alarm devices when it is detected that all of the system's interconnected alarm devices are activated and are each providing an audible fire warning, and the smoke, heat, or carbon monoxide detection and warning functions of each of the system's interconnected alarm devices are tested by a single person operating the momentary action test switch of one of the system's interconnected alarm devices so that the alarm device is in test mode, maintaining the said interconnected alarm device in test mode by continuing to push the test switch until the said indicating means activates to indicate that all of the system's interconnected alarm devices have activated and are each providing a fire warning, and terminating the testing of the interconnected alarm device by releasing the pressure on the momentary action test switch of said interconnected alarm device when said indicating means have confirmed that all of the system's remaining alarm devices are activated. The single person repeating all the previously described actions and verifications for each of the system's remaining interconnected alarm devices when they are tested in turn, one at a time, to result in the warning functions of all of the system's alarm devices being tested.

In general, one innovative aspect of the subject matter described in this specification can be embodied in an interconnected fire alarm system that includes two or more compatible interconnected alarm devices hard wired to a power supply of any type, with each of the interconnected alarm devices having a momentary action push to test switch. Each of the system's alarm devices including a relay which operates when a higher alarm device current is detected when the alarm device is activated, such as when the alarm device is in test mode or in alarm mode, or when the alarm device has received a wireless interconnection signal when another interconnected alarm device is in test mode or in alarm mode. The system may further include an RF wireless transmitter, hard wired to the power source, and connected to the normally closed relay contacts of all of the system's interconnected alarm devices, such that the transmitter operates and transmits a wireless RF signal when all the alarm device relays are energised and their respective normally closed relay contacts open. The system may further include a standalone portable battery-operated RF receiver which, upon receipt of a wireless signal from the RF transmitter previously described, operates an electronic switch to turn on a light emitting diode to indicate that all the system's interconnected alarm devices have activated and are providing a fire warning.

BRIEF DESCRIPTION OF THE DRAWINGS

FIG. 26 is a block diagram for a smoke alarm system that includes three interconnected smoke alarms;

Figure 1:
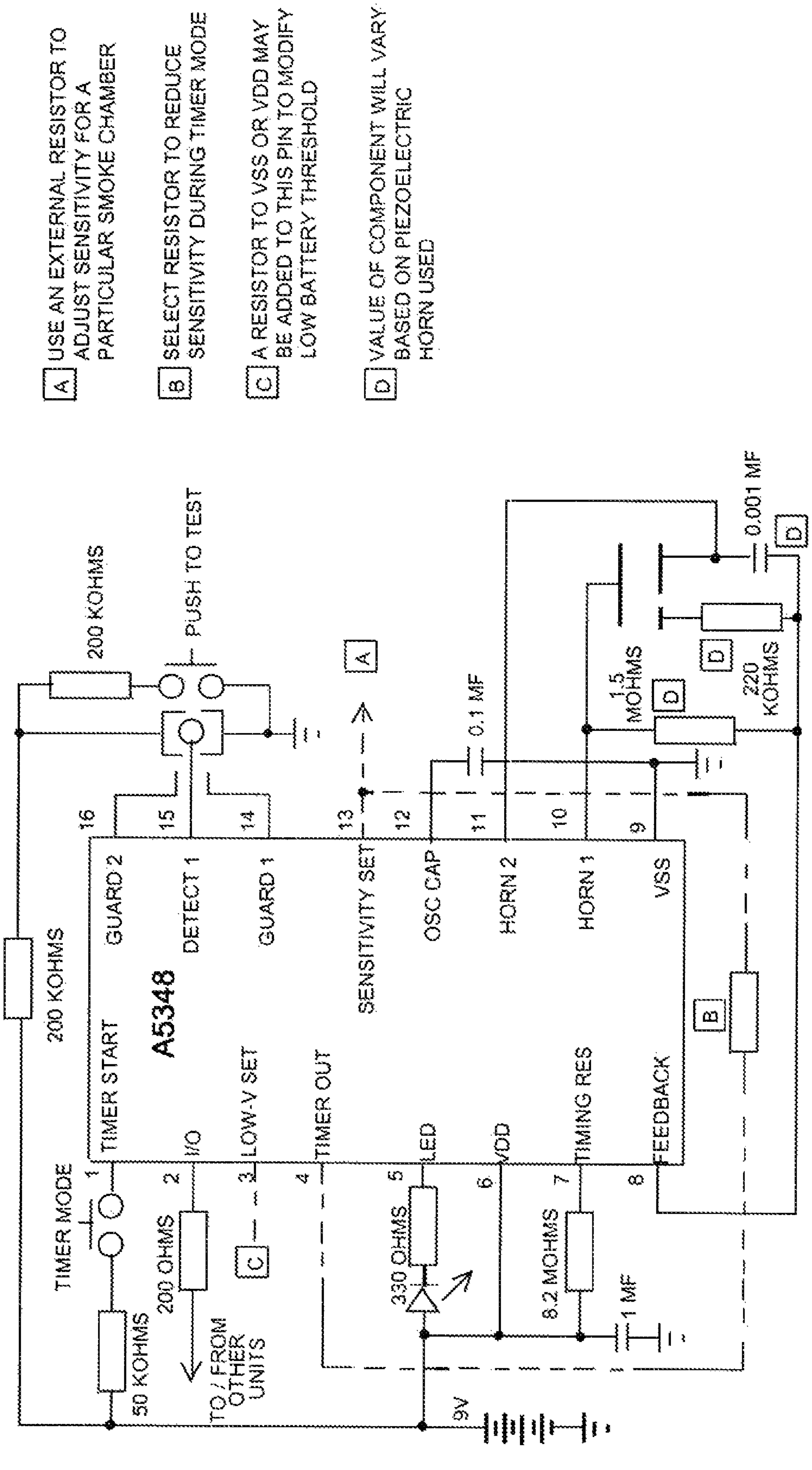
FIG. 1 is a typical ionization smoke alarm circuit that includes a test switch.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and Figures.

DESCRIPTION

Although the test facility of a battery operated standalone smoke alarm can be in the form of mechanical means, modern smoke alarms almost invariably incorporate electrical means to simulate the presence of smoke in the smoke alarm sensing assembly. This is exemplified by FIG. 1, which is the Typical Application circuit diagram for the Allegro MicroSystems Ionization Smoke Detector with Interconnect and Timer integrated circuit A5348.

Referring to FIG. 1, a typical ionization smoke alarm circuit incorporating the Allegro MicroSystems integrated circuit A5348 includes a test switch whose normally open momentary action contact is connected in series with two 200 kilo ohms resistors across the 9V battery power supply. To test the smoke alarm, the test switch is operated or pushed so that its normally open contact closes to electrically simulate the presence of smoke in the smoke alarm sensing assembly. If the tested smoke alarm is in good working order, the simulation of the presence of smoke in the sensing assembly results in an audible fire warning being provided by a piezoelectric horn connected to pins 10, 11, and 8 of the Allegro MicroSystems integrated circuit A5348. The audible fire warning is provided for as long as the test switch is operated or pushed when its contact is closed.

It is to be noted that an important characteristic of smoke alarms is the push to test function, which requires the person doing the test to be at the smoke alarm location when a test is under way. If there are more than one smoke alarm, the smoke alarms are tested one at a time by moving from one smoke alarm location to the next to repeat the test.

It is also to be noted that, in accordance with FIG. 1, and although Pin 2 of the Allegro MicroSystems integrated circuit A5348 of the typical ionization smoke alarm circuit can be connected to other smoke alarms for common alarm communication, battery operated standalone smoke alarms do not make use of the interconnection facility.

Single Supply Battery Operated Smoke Alarms—Interconnected by Hard Wiring

Interconnected battery operated hard wired smoke alarms are identical in their operation to standalone battery operated smoke alarms previously described, with the exception that the smoke alarms are interconnected by electrical wiring for common alarm communication.

Thus, if any one of the interconnected smoke alarms detects smoke or is tested, the smoke alarm will activate to provide an audible fire warning. The activation of the smoke alarm also provides a signal on the interconnect wiring to cause all of the remaining hard wired interconnected smoke alarms to also produce the audible fire warning.

Figure 2:
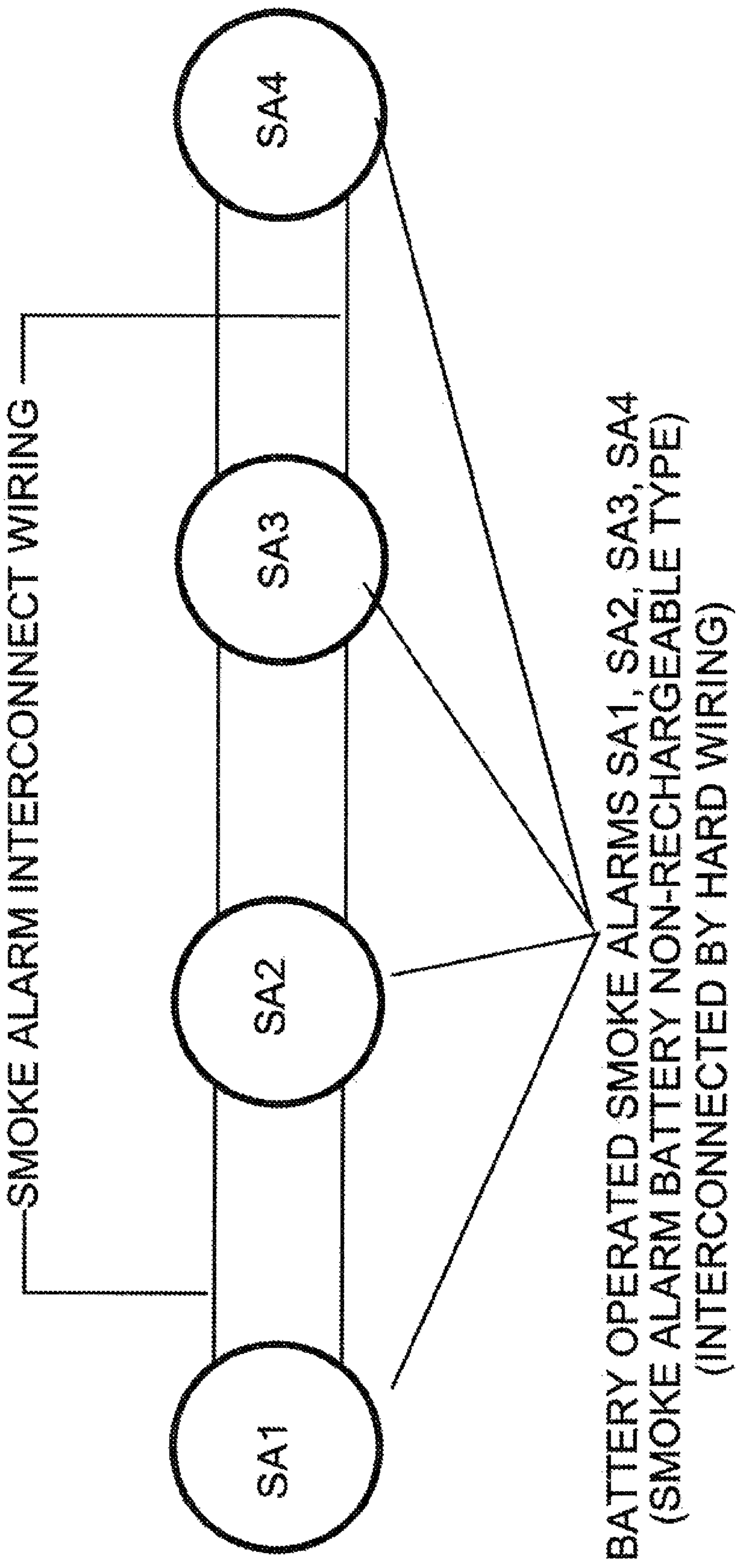
FIG. 2 is a diagram of four battery operated smoke alarms SA1, SA2, SA3 and SA4 which are interconnected by a two-conductor electrical wiring.

FIG. 2 is a diagram of four battery operated smoke alarms SA1, SA2, SA3 and SA4 which are interconnected by a two-conductor electrical wiring which provides a common signal path for all four interconnected smoke alarms. Each interconnected smoke alarm has a momentary action push to test switch which is identical to that described for the standalone battery operated smoke alarm.

In order to ascertain that an interconnected smoke alarm is able to detect smoke and provide a fire warning in a fire event, the following functions of the interconnected smoke alarm are required to tested and proved:

- the ability of the interconnected smoke alarm to activate when tested to provide an audible fire warning; and
- the ability of the interconnected smoke alarm to activate when tested to provide a signal via the interconnection wiring and cause all the remaining interconnected smoke alarms to also activate and produce the audible fire warning; and
- the ability of the interconnected smoke alarm to activate and provide an audible fire warning upon receipt of a signal provided via the interconnection wiring by another interconnected smoke alarm being tested.

Single Supply Battery Operated Smoke Alarms—Interconnected by Wireless Means

Wireless interconnected battery operated smoke alarms are identical in their operation to standalone battery operated smoke alarms previously described, with the exception that the smoke alarms are interconnected by wireless means for common alarm communication.

Thus, if any one of the wireless interconnected smoke alarms detects smoke or is tested, the smoke alarm will activate to provide an audible fire warning. The activation of the smoke alarm also provides a wireless signal, such as a Radio Frequency (RF) signal, to cause all of the remaining wireless interconnected smoke alarms to also produce the audible fire warning.

Figure 3:
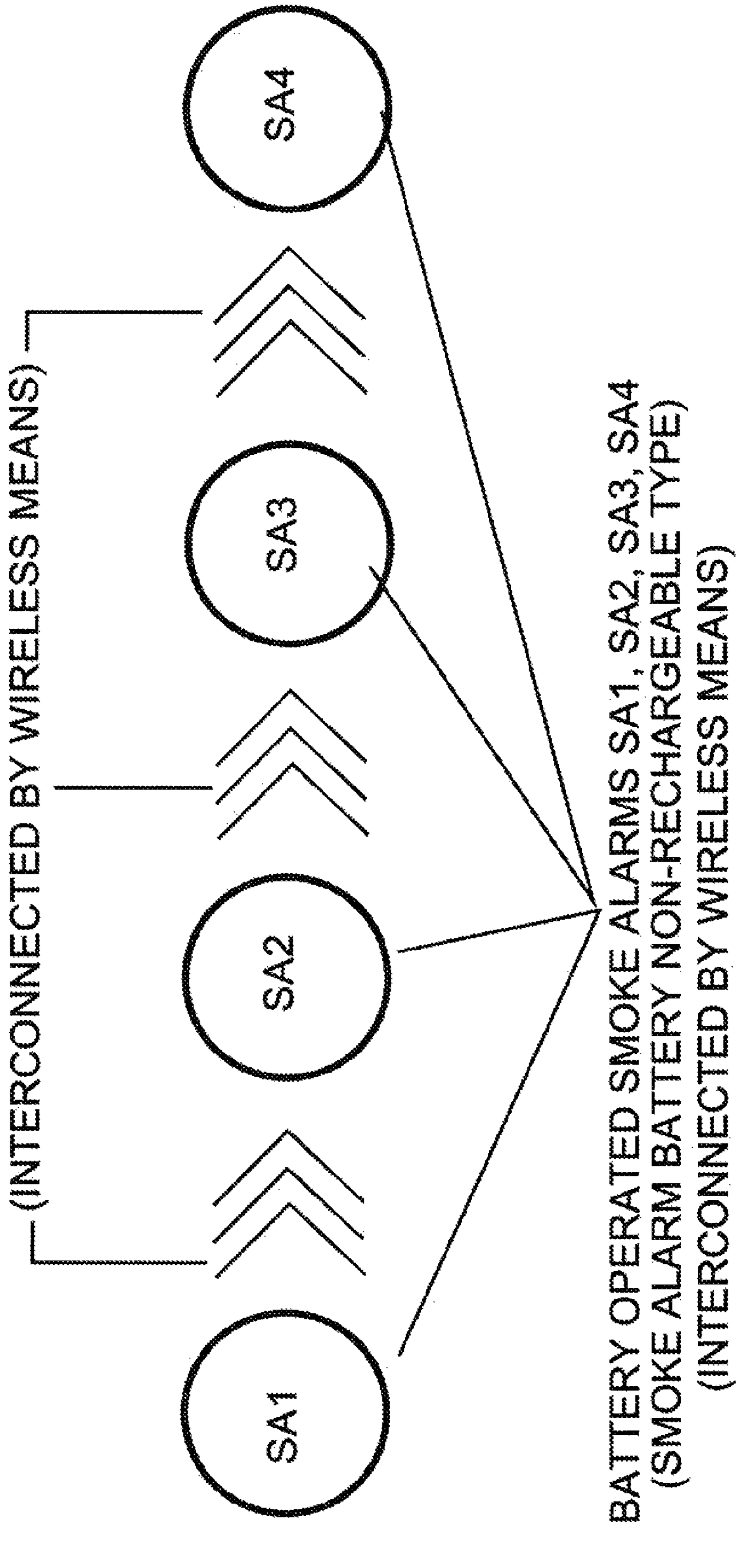
FIG. 3 is a diagram of four wireless interconnected battery operated smoke alarms SA1, SA2, SA3 and SA4 which are interconnected by wireless means.

FIG. 3 is a diagram of four wireless interconnected battery operated smoke alarms SA1, SA2, SA3 and SA4 which are interconnected by wireless means such as Radio Frequency signal transmission. Each interconnected smoke alarm has a momentary action push to test switch which is identical to that described for the standalone battery operated smoke alarm.

Functionality of Interconnected Smoke Alarms

For testing purposes, in order to ascertain that an interconnected smoke alarm is able to detect smoke and provide a fire warning in a fire event, the following functions of the interconnected smoke alarm are required to tested and proved.

For hard wired interconnected smoke alarms:

- the ability of the hard wired interconnected smoke alarm to activate when tested to provide an audible fire warning; and
- the ability of the hard wired interconnected smoke alarm to activate when tested to provide a signal via the interconnection wiring and cause all the remaining hard wired interconnected smoke alarms to also produce the audible fire warning; and
- the ability of the interconnected hard wired smoke alarm to activate and provide an audible fire warning upon receipt of a signal provided via the interconnection wiring by another hard wired interconnected smoke alarm being tested.

For wireless interconnected smoke alarms:

the ability of the wireless interconnected smoke alarm to activate when tested to provide an audible fire warning; and the ability of the wireless interconnected smoke alarm to activate when tested to provide a wireless signal and cause all the remaining wireless interconnected smoke alarms to also produce the audible fire warning; and the ability of the wireless interconnected smoke alarm to activate and provide an audible fire warning upon receipt of a wireless signal provided by another wireless interconnected smoke alarm being tested.

Proving the Ability of the Interconnected Smoke Alarm to Activate when Tested to Provide an Audible Fire Warning—Hard Wired Interconnected Smoke Alarms and Wireless Interconnected Smoke Alarms To prove this function, one person is required at the interconnected smoke alarm to push the momentary action smoke alarm test switch and to confirm that the interconnected smoke alarm being tested activates to provide the audible fire warning. Proving this function can be done by one person alone at the location of the smoke alarm being tested and applies equally to smoke alarms with interconnections by hard wiring and by wireless means.

Proving the Ability of the Interconnected Smoke Alarm to Activate when Tested to Provide a Signal Via the Interconnection Wiring and Cause all the Remaining Hard Wired Interconnected Smoke Alarms to Activate and Produce the Audible Fire Warning—Smoke Alarms with Hard Wired Interconnections As the hard wired interconnected smoke alarms are in different locations within the protected building, to prove this function one person is required at the hard wired interconnected smoke alarm being tested to push and hold the momentary action smoke alarm test switch, whilst a second person is required to go to each of the remaining hard wired interconnected smoke alarm locations to confirm that each one of them is activated and is providing the audible fire warning.

Proving the Ability of the Wireless Interconnected Smoke Alarm to Activate when Tested to Provide a Wireless Signal and Cause all the Remaining Wireless Interconnected Smoke Alarms to Activate and Also Produce the Audible Fire Warning—Smoke Alarms Interconnected by Wireless Means As the wireless interconnected smoke alarms are in different locations within the protected building, to prove this function one person is required at the wireless interconnected smoke alarm being tested to push and hold the momentary action smoke alarm test switch, whilst a second person is required to go to each of the remaining wireless interconnected smoke alarm locations to confirm that each one of them is activated and is providing the audible fire warning.

Proving the Ability of the Hard Wired Interconnected Smoke Alarm to Activate Upon Receipt of a Signal Via the Interconnection Wiring to Produce the Audible Fire Warning when any One of the Remaining Hard Wired Interconnected Smoke Alarms is Tested—Smoke Alarms with Hard Wired Interconnections As the interconnected hard wired smoke alarms are in different locations within the protected building, to prove this function one person is required at the location of another interconnected hard wired smoke alarm being tested to push and hold the momentary action smoke alarm test switch, whilst a second person is required to go to the location of the hard wired interconnected smoke alarm to ascertain that the interconnected hard wired smoke alarm has received a signal from the smoke alarm being tested via the interconnection hard wiring so that it activates to provide the audible fire warning.

Proving the Ability of the Wireless Interconnected Smoke Alarm to Activate Upon Receipt of a Signal Transmitted by Wireless Means to Produce the Audible Fire Warning when any One of the Remaining Wireless Interconnected Smoke Alarms is Tested—Smoke Alarms Interconnected by Wireless Means As the wireless interconnected smoke alarms are in different locations within the protected building, to prove this function one person is required at the location of another interconnected wireless smoke alarm being tested to push and hold the momentary action test switch of the wireless interconnected smoke alarm, whilst a second person is required to go to the location of the wireless interconnected smoke alarm to ascertain that the wireless smoke alarm has received a signal transmitted by wireless means by the smoke alarm being tested so that it activates to provides the audible fire warning.

Summary—Full Functionality Testing of Interconnected Smoke Alarms—Hard Wired Interconnected Smoke Alarms and Wireless Interconnected Smoke Alarms In practice, testing of all the above previously described smoke detection and warning functions of both hard wired interconnected smoke alarms and wireless interconnected smoke alarms can be undertaken by having:

one person pushing and holding the test switch of each of the interconnected smoke alarms to verify that the smoke alarm activates to produce the audible fire warning; and the person maintaining the interconnected smoke alarm in test mode whilst another person verifies that all the remaining interconnected smoke alarms not being tested are activated and are providing the fire warning signal; and to ensure that all the smoke detection and warning functions of all the interconnected smoke alarms are fully tested, each of the interconnected smoke alarms is tested in turn, one at a time by one person, whilst the other person verifies that when each of the smoke alarms is tested, that all the other remaining interconnected smoke alarms are activated and are providing the audible fire warning.

Other Types of Interconnected Smoke Alarms

Figure 4:
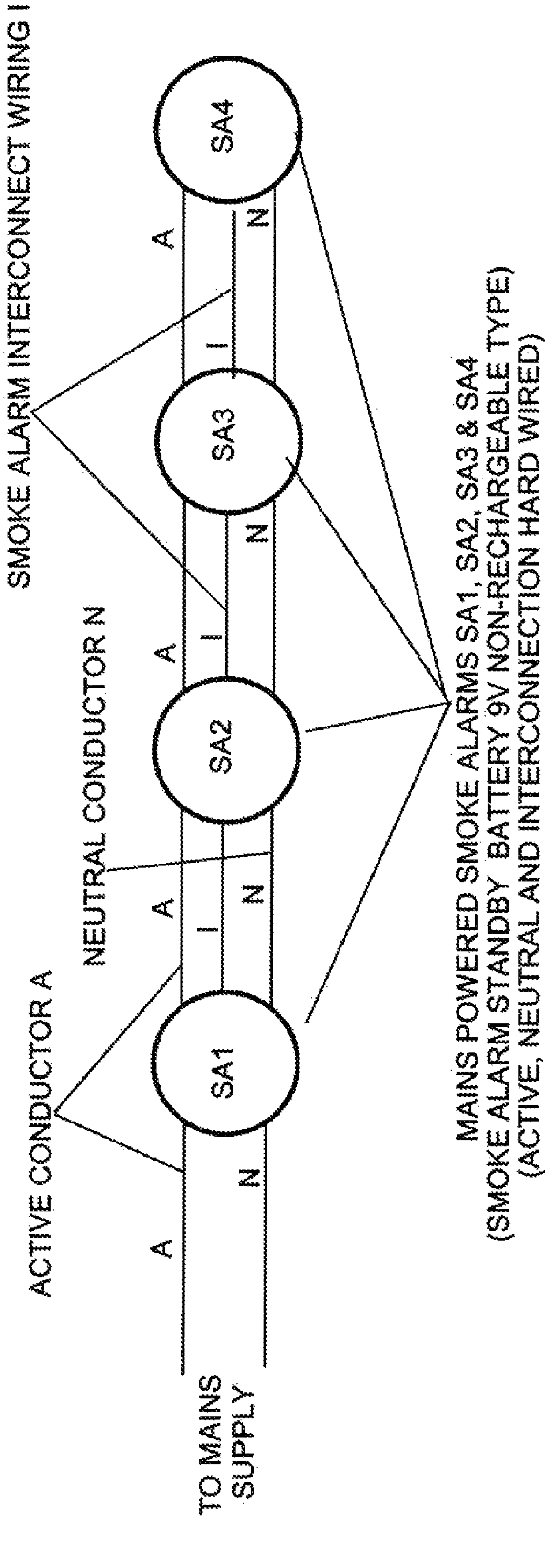
FIG. 4 illustrates dual supply hard wired interconnected smoke alarms with non-rechargeable battery powered directly from mains electricity power supply, and with hard wired interconnections.

Although there are a number of different types of other interconnected smoke alarms used in dwellings, they all have their momentary action test switch as well as their warning and interconnection functions identical to those already described for battery operated interconnected smoke alarms, with the main difference being the type of power source used to supply the interconnected smoke alarms. Similarly, the testing of the smoke detection and the warning functions of the other types of interconnected smoke alarms is also exactly the same as previously described for battery operated interconnected smoke alarms. Given below is a brief description of the various other most common types of interconnected smoke alarms currently available for the protection of dwellings:

Dual supply hard wired interconnected smoke alarms with non-rechargeable battery powered directly from mains electricity power supply, and with hard wired interconnections—As depicted by FIG. 4, these smoke alarms are hard wired for power and interconnection. These smoke alarms also have a primary power supply derived from the building's mains electricity power supply and a non-rechargeable standby battery for times when mains power has failed. The non-rechargeable standby battery is often a 9V battery which is required to be replaced every year, or a 10-year life battery which is expected to last the full life of the smoke alarm.

Referring to FIG. 4, power is supplied to the four interconnected smoke alarms via an Active conductor A and a Neutral conductor N connected to the building's mains electricity power supply. A third Interconnect conductor I completes the wiring to provide a signal path between the smoke alarms for common alarm communication between all four interconnected smoke alarms.

Figure 5:
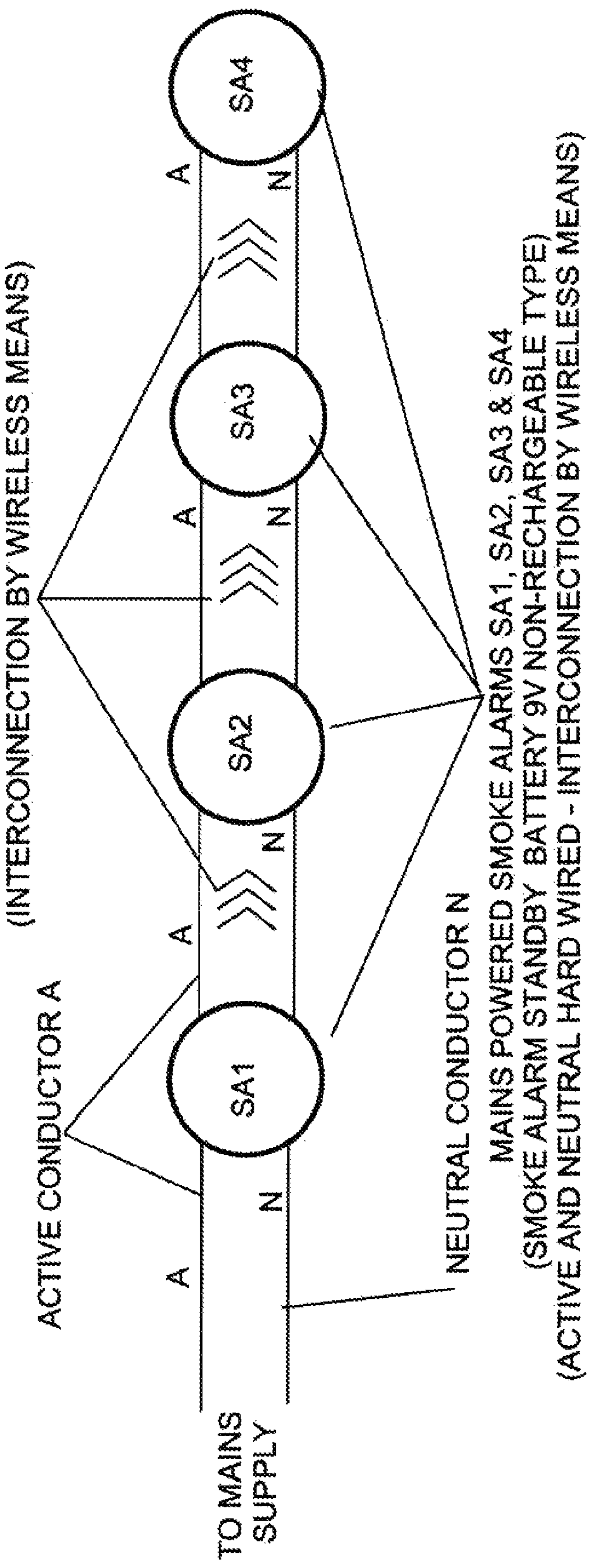
FIG. 5 illustrates dual supply hard wired interconnected smoke alarms with non-rechargeable battery powered directly from mains electricity power supply, and with wireless interconnections.

Dual supply hard wired interconnected smoke alarms with non-rechargeable battery powered directly from mains electricity power supply, and with wireless interconnections—As depicted by FIG. 5, these smoke alarms are hard wired for power and have a primary power supply, derived from the building's mains electricity power supply, and a non-rechargeable standby battery for times when mains power has failed. The non-rechargeable standby battery is often a 9V battery which is required to be replaced every year, or a 10-year life battery which is expected to last the full life of the smoke alarm.

Referring to FIG. 5, power is supplied to the four interconnected smoke alarms via an Active conductor A and a Neutral conductor N connected to the building's mains electricity power supply. The signal path for interconnection of the four smoke alarms is by wireless means for common alarm communication between all four interconnected smoke alarms.

Dual supply hard wired interconnected smoke alarms with rechargeable battery powered directly from mains electricity power supply, and with hard wired interconnections—Dual supply hard wired interconnected smoke alarms with rechargeable batteries powered directly from mains supply, and with hard wired interconnection, are as depicted by FIG. 4 previously described, except that the standby battery of each interconnected smoke alarms is of the rechargeable type. The smoke alarms of this type include a battery charger to keep the battery charged using power derived from mains supply.

Dual supply hard wired interconnected smoke alarms with rechargeable battery powered directly from mains electricity power supply, and with wireless interconnections—Dual supply interconnected smoke alarms with rechargeable batteries powered directly from mains supply, and with wireless interconnection, are as depicted by FIG. 5 previously described, except that the standby battery of each interconnected smoke alarm is of the rechargeable type. The smoke alarms of this type include a battery charger to keep the battery charged using power derived from mains supply.

Figure 6:
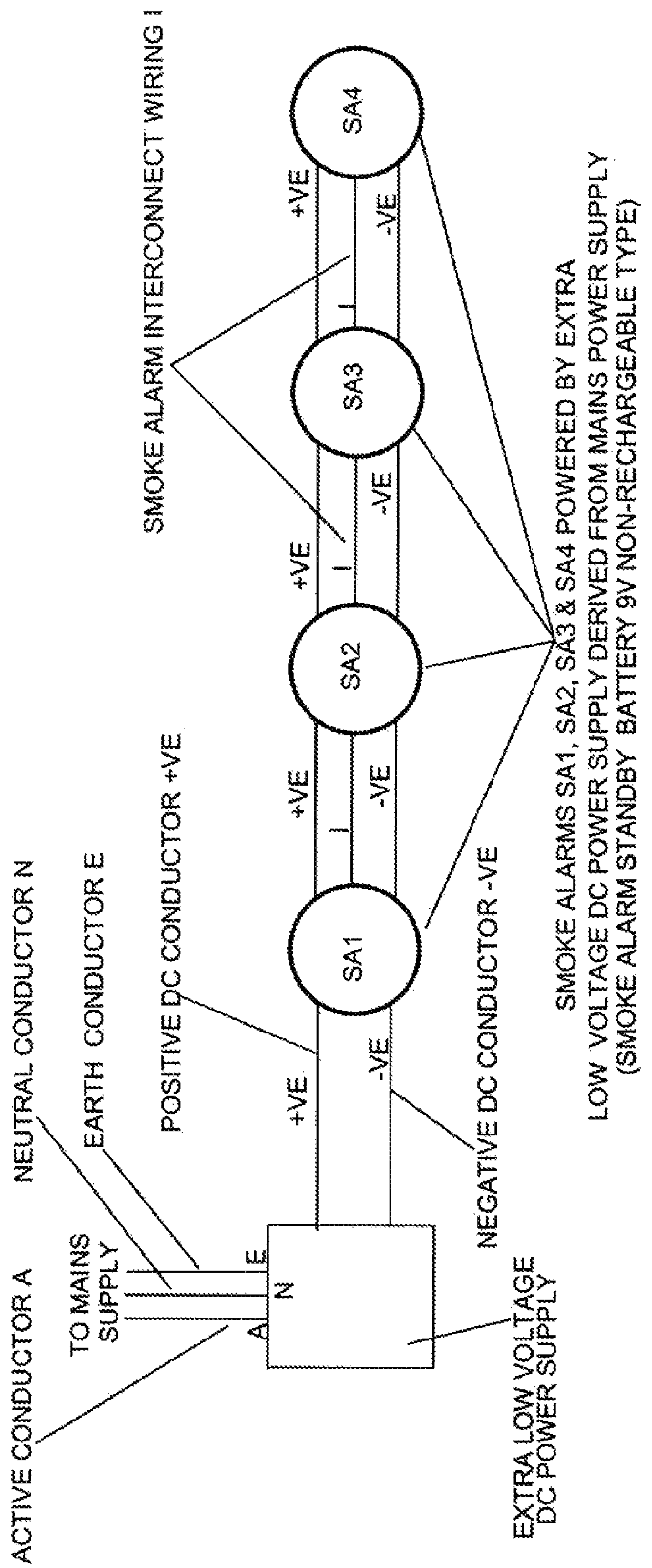
FIG. 6 illustrates extra low voltage DC power supply that is used as the primary power supply for an interconnected hard wired smoke alarm system.

Dual supply hard wired interconnected smoke alarms with non-rechargeable battery powered from an external power supply derived from mains power supply, and with hard wired interconnections—These smoke alarms are hard wired for power and interconnection and are identical to dual supply interconnected hard wired smoke alarms with non-rechargeable batteries powered directly from mains power supply as depicted by FIG. 4 except that:

- mains power is stepped down and rectified to provide to an extra low voltage power supply, usually around 12V DC; and
- the extra low voltage DC power supply is then used as the primary power supply for the interconnected hard wired smoke alarm system as depicted by FIG. 6.

Figure 7:
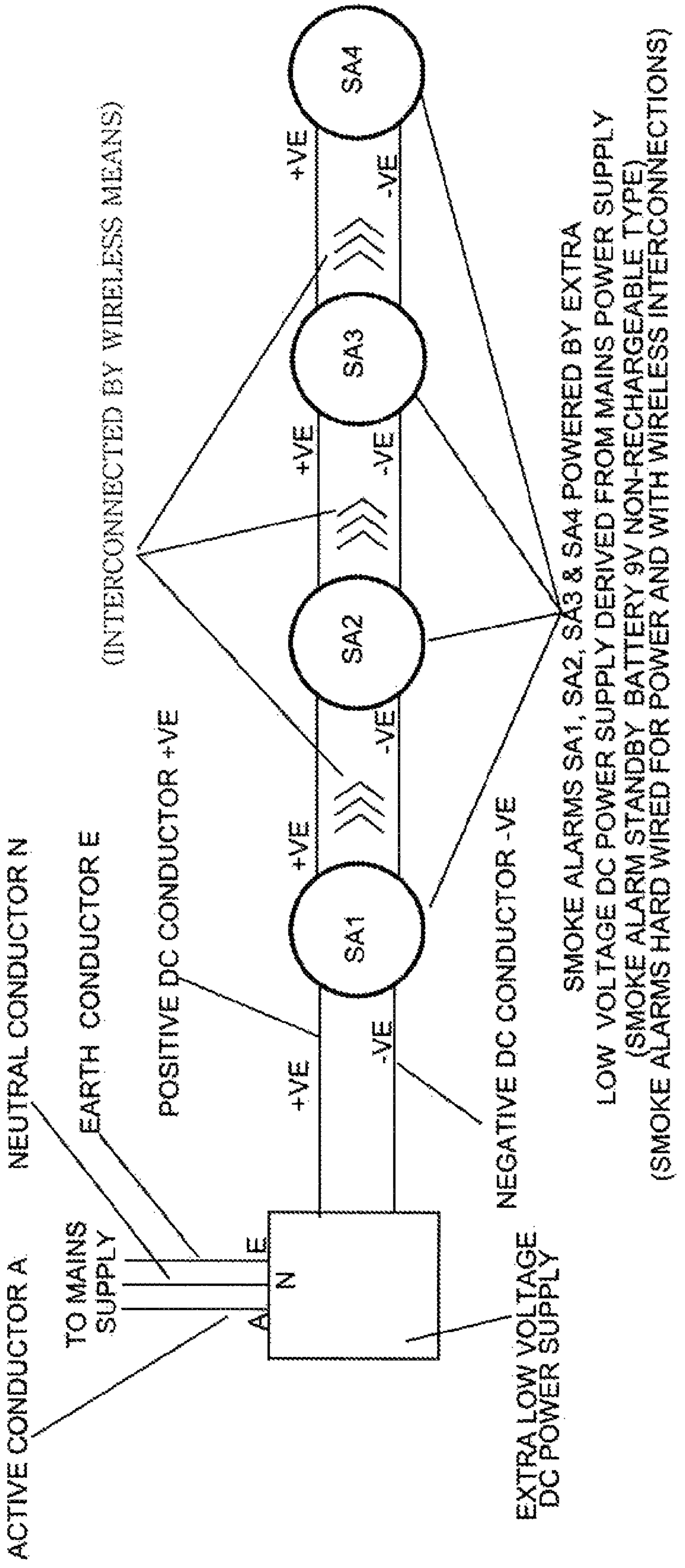
FIG. 7 illustrates extra low voltage DC power supply is then used as the primary power supply for the interconnected hard wired smoke alarm system.

Dual supply interconnected smoke alarms with non-rechargeable battery powered from an external power supply derived from mains power supply by hard wiring, and with wireless interconnections—These smoke alarms are identical to dual supply smoke alarms with non-rechargeable batteries powered directly from mains supply, and with wireless interconnection, are as depicted by FIG. 5 previously described, except that:

- mains power is stepped down and rectified to provide to an extra low voltage power supply, usually around 12V DC; and
- the extra low voltage DC power supply is then used as the primary power supply for the interconnected hard wired smoke alarm system as depicted by FIG. 7.

Single supply hard wired interconnected smoke alarms powered from an external power supply derived from mains electricity power supply which incorporates a standby rechargeable battery backup supply, and with hard wired interconnections—These smoke alarms do not have internal batteries and are powered only by an extra low voltage power supply derived from mains electricity power supply. The smoke alarms are hard wired for power and for interconnection as depicted by FIG. 8.

Figure 8:
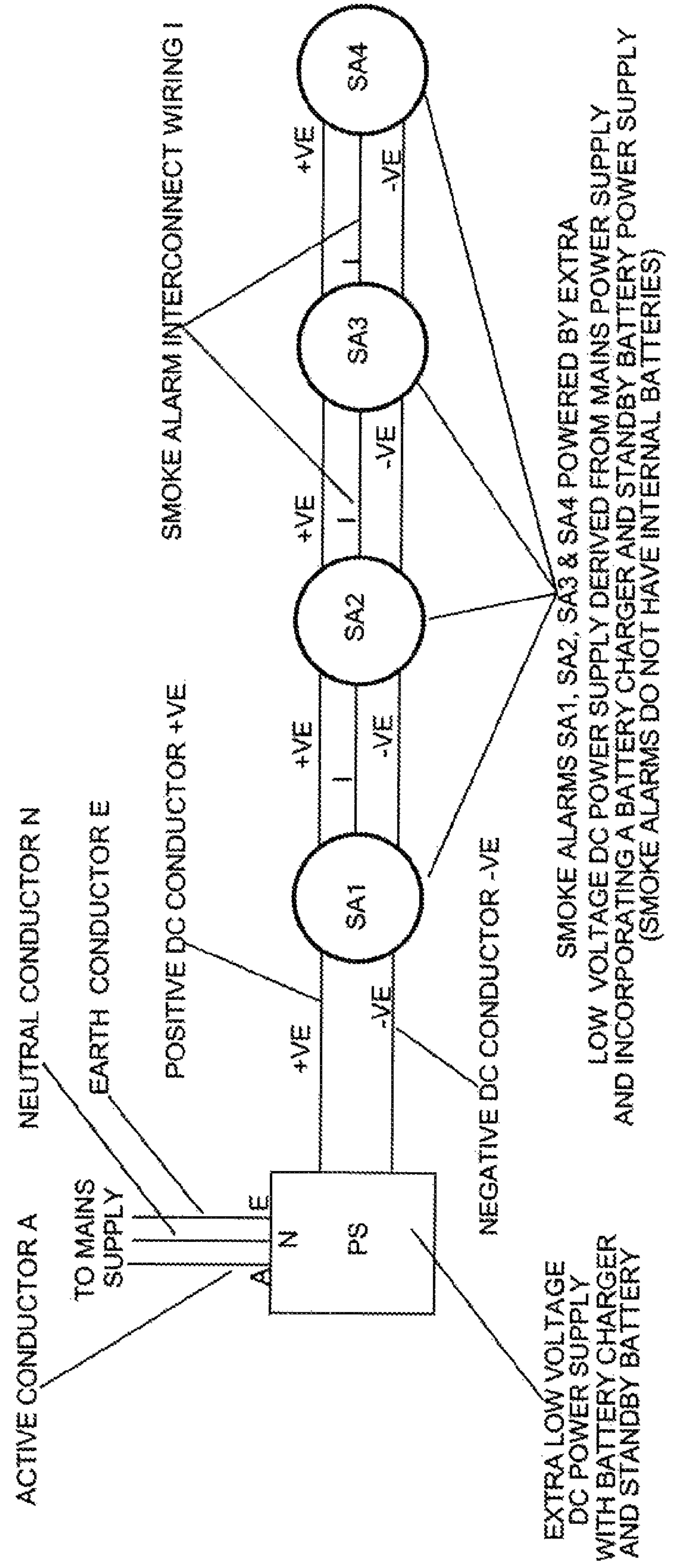
FIG. 8 illustrates a hard wired interconnected smoke alarm system of four smoke alarms SA1, SA2, SA3, and SA4 that are connected to an extra low voltage power supply PS by positive and negative conductors +VE and −VE respectively.

Referring to FIG. 8, the hard wired interconnected smoke alarm system depicted comprises of four smoke alarms SA1, SA2, SA3, and SA4 and are connected to an extra low voltage power supply PS by positive and negative conductors +VE and −VE respectively. The smoke alarm system also incorporates an additional interconnect conductor I that provides a signal path between all of the system's hard wired interconnected smoke alarms for common alarm communication between all smoke alarms in alarm or test mode.

The extra low voltage power supply PS as depicted by FIG. 8 includes the following important components:

- a power conversion section where mains power is stepped down and rectified to provide to an extra low voltage power supply, usually around 12V DC; and
- a battery charger; and
- a standby battery such as a rechargeable sealed lead acid battery which is kept charged by the battery charger.

The extra low voltage power supply and its standby battery are configured such that under conditions when mains supply is available, the hard wired interconnected smoke alarm system is powered from mains supply, and switching to the standby battery supply automatically when mains power fails or is not available.

Single supply hard wired interconnected smoke alarms powered from an external power supply derived from mains electricity power supply which incorporates a standby rechargeable battery backup supply, and with wireless interconnections—These smoke alarms do not have internal batteries and are powered only by an extra low voltage power supply derived from mains electricity power supply. The smoke alarms are hard wired for power and have wireless interconnections as depicted by FIG. 9.

Figure 9:
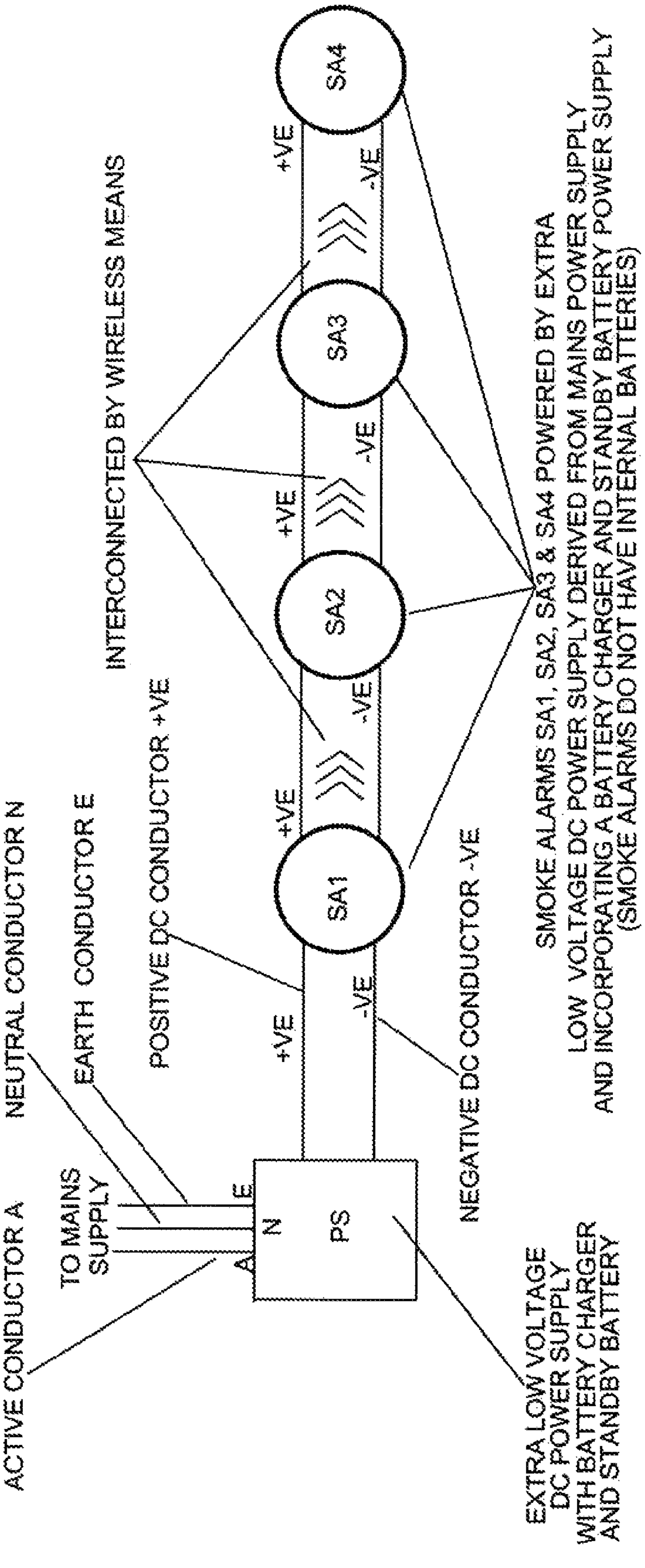
FIG. 9 illustrates an interconnected smoke alarm system of four smoke alarms SA1, SA2, SA3, and SA4 that are connected to an extra low voltage power supply PS by positive and negative conductors +VE and −VE respectively.

Referring to FIG. 9, the interconnected smoke alarm system depicted comprises of four smoke alarms SA1, SA2, SA3, and SA4 and are connected to an extra low voltage power supply PS by positive and negative conductors +VE and −VE respectively. The smoke alarm system also has wireless interconnection means that provides a signal path between all of the system's interconnected smoke alarms for common alarm communication between all smoke alarms in alarm or test mode.

The extra low voltage power supply PS as depicted by FIG. 9 includes the following important components:

- a power conversion section where mains power is stepped down and rectified to provide to an extra low voltage power supply, usually around 12V DC; and
- a battery charger; and a standby battery such as a rechargeable sealed lead acid battery which is kept charged by the battery charger.

The extra low voltage power supply and its standby battery are configured such that under conditions when mains supply is available, the interconnected smoke alarm system is powered from mains supply and switching to the standby battery supply automatically when mains power fails or is not available.

Other types of fire alarm devices—Apart from smoke alarms, which are only responsive to the presence of smoke, there are other types of alarm devices that respond to other fire safety related hazardous conditions, namely:

Combination alarms—The combination alarms that can detect more than one fire product. Thus, combination alarms exist that are responsive to smoke, heat and carbon monoxide in any combination.

Just like with smoke alarms, combination alarms come with a variety of power supply types and are available as standalone alarm devices or as interconnected alarm devices. Also, and as with smoke alarms, interconnecting combination alarms for common alarm communication can be by hard wiring or by wireless means.

Heat alarms—Heat alarms perform the same functions as smoke alarms when heat, as a result of a fire for example, is sensed. Manufacturers of smoke alarms usually have compatible heat alarms that can be interconnected to other smoke alarms within their range. Although less sensitive and likely to activate later than a smoke alarm in a fire event, heat alarms are used in areas where it would be inappropriate to use a smoke alarm, an example being in kitchen areas where cooking fumes and steam are likely to produce nuisance alarms.

Just like with smoke alarms, heat alarms come with a variety of power supply types and are available as standalone alarm devices or as interconnected alarm devices.

Also, and as with smoke alarms, interconnecting heat alarms can be by hard wiring or by wireless means.

Carbon monoxide alarms—Carbon monoxide alarms are responsive to the presence of carbon monoxide which is a poisonous gas that can build up in the home as a result of, as an example, the malfunctioning of combustion fuel heaters. Upon detection of carbon monoxide gas, the carbon monoxide alarms will activate to provide a warning to occupants in the same way a smoke alarm would do. Carbon monoxide can also be produced during a fire where the availability of oxygen is reduced or limited.

Manufacturers of smoke alarms sometimes have compatible carbon monoxide alarms that can be interconnected with smoke alarms within their range. Thus, carbon monoxide alarms, in combination with smoke and heat alarms, provide an enhanced level of safety for occupants.

Just like with smoke alarms, carbon monoxide alarms come with a variety of power supply types and are available as standalone alarm devices or as interconnected alarm devices. As with smoke alarms, interconnecting carbon monoxide alarms for common alarm communication can be by hard wiring or by wireless means.

LPG Gas and Natural Gas alarms—LPG Gas and Natural Gas are used in the home for cooking and heating and a gas leak can poison occupants or cause an explosion. LPG Gas and Natural Gas alarms respond to LPG Gas and Natural Gas presence in the home, for example as a result of a gas leak, to warn occupants of a gas hazard.

Although LPG Gas and Natural Gas alarms are similar to the other alarm devices previously described, they are usually wired separately from smoke, heat and carbon monoxide alarms and have much higher quiescent current consumption. For the latter reason, they almost invariably are mains powered, do not usually have standby batteries, and are normally not interconnected with smoke, heat or carbon monoxide alarms for common alarm communication.

Smoke alarms and other alarm devices trends—Although the above descriptions cover the majority of smoke alarms and other alarm devices currently available today, there are a number of new alarm devices coming onto the market that do not completely fit the previously described types. An example of this are smoke alarms that are available that have the options of either hard wired or wireless interconnections.

Because of the evolving trend in the design of smoke, heat and carbon monoxide alarm devices, and for clarity, subsequent sections of this specification will make specific reference to the interconnection of smoke, heat and carbon monoxide alarm devices as being either hard wired interconnected or wireless interconnected, or as with hard wired interconnections or with wireless interconnections. Furthermore, in subsequent sections of this specification, when smoke, heat or carbon monoxide alarms are connected to a power supply by fixed or permanent wiring, the smoke, heat and carbon monoxide alarms are being referred to as being hard wired to the power source, or hard wired for power.

Definitions

Alarm device: a smoke, heat, or carbon monoxide alarm

Carbon monoxide alarm: A device containing a carbon monoxide detector and an alarm sounding device.

Common alarm communication: The activation of all interconnected alarm devices, such as smoke, heat, or carbon monoxide alarms, when any one or more of the alarm device is tested, or when any one or more of the interconnected smoke, heat, or carbon monoxide alarm detects smoke, heat or carbon monoxide respectively. When activate, each interconnected smoke, heat, or carbon monoxide alarm provides an audible fire warning.

Compatible alarm devices-Alarm devices that are able to be interconnected by hard wiring or by wireless means for common alarm communication between the compatible alarm devices.

Hard wired: Permanent wiring as found in buildings

Hard wired interconnected smoke, heat and carbon monoxide alarm device activation: The response of a smoke, heat, or carbon monoxide alarm device, with hard wired interconnection, to:

The detection of smoke, heat or carbon monoxide by the respective interconnected smoke, heat or carbon monoxide alarm device; or The respective interconnected smoke, heat or carbon monoxide alarm device being tested; or The respective smoke, heat or carbon monoxide alarm device receiving a signal via the interconnection hard wiring when another interconnected smoke, heat, or carbon monoxide alarm device is activated due to the detection of smoke, heat or carbon monoxide respectively; or The respective smoke, heat or carbon monoxide alarm device receiving a signal via the interconnection hard wiring when another interconnected smoke, heat, or carbon monoxide alarm device is activated due to the interconnected alarm device being tested.

When activated, the smoke, heat or carbon monoxide alarm with hard wired interconnection provides an audible fire warning.

Heat alarm: A device containing a heat detector and an alarm sounding device.

Interconnection of any type: Interconnection by hard wiring or by wireless means.

Interconnected smoke alarm system: A system comprising of at least two compatible smoke alarms that are interconnected by hard wiring or by wireless means for the purpose of common alarm communication between the interconnected smoke alarms.

Interconnected fire alarm system: A system comprising of at least two compatible smoke, heat, or carbon monoxide alarms in any combination, that are interconnected by hard wiring or by wireless means for the purpose of common alarm communication between the interconnected smoke, heat, or carbon monoxide alarms.

Liquefied Petroleum Gas (LPG) alarm: A device containing an LPG detector and an alarm sounding device.

Momentary action alarm device test switch: A push to test switch used to electrically simulate the presence of smoke, heat, carbon monoxide, natural gas or liquefied petroleum gas (LPG) in the sensing assembly of a smoke, heat, carbon monoxide, natural gas or liquefied petroleum gas (LPG) alarm respectively. The alarm device continues to be tested for as long as the momentary action test switch is pushed.

ON and OFF switch: A switch with a contact that can be either ON (closed) or OFF (open), and unlike a momentary action switch, the On and Off switch is latching in both the ON or OFF positions and does not require the pressure to be maintained for the switch contact to remain in an ON or OFF positions once the switch is operated.

Power source of any type-Power supply arrangement of any type of alarm device as previously described for interconnected smoke alarms in this specification.

Smoke alarms: A device containing a smoke detector and an alarm sounding device.

Smoke, heat and carbon monoxide alarm device audible fire warning: The sound emitted by a smoke, heat, or carbon monoxide alarm to alert occupants when the alarm device is activated.

Smoke, heat, or carbon monoxide alarms in any combination-Any combination of compatible smoke, heat or carbon monoxide alarms, up to the maximum number of alarms that can be interconnected by hard wiring or by wireless means. In the case of the maximum number of alarms that can be interconnected being 12, the following are three examples of possible combinations:

12 smoke alarms-full capacity 6 smoke alarms and 4 heat alarms-full interconnection capacity not used 11 smoke alarms and 1 carbon monoxide alarm-full capacity Smoke, heat, or carbon monoxide alarm device test mode: The activated state of a smoke, heat, or carbon monoxide alarm device when it is being tested. In the test mode a functioning smoke, heat or carbon monoxide alarm device provides an audible fire warning.

Wireless interconnected smoke, heat and carbon monoxide alarm device activation: The response of a smoke, heat, or carbon monoxide alarm device, with interconnection by wireless means, to:

The detection of smoke, heat or carbon monoxide by the respective interconnected smoke, heat or carbon monoxide alarm device; or The respective interconnected smoke, heat or carbon monoxide alarm device being tested; or The respective smoke, heat or carbon monoxide alarm device receiving a signal by wireless means when another interconnected smoke, heat, or carbon monoxide alarm device is activated due to the detection of smoke, heat or carbon monoxide respectively; or The respective smoke, heat or carbon monoxide alarm device receiving a signal by wireless means when another interconnected smoke, heat, or carbon monoxide alarm device is activated due to the interconnected alarm device being tested.

When activated, the smoke, heat or carbon monoxide alarm provides an audible fire warning.

Disadvantages of Existing Interconnected Smoke, Heat, or Carbon Monoxide Alarms for the Protection of a Dwelling Occupied by a Single Occupant/Owner It has been established that at least two persons are required in order to fully test the detection and warning functions of existing interconnected smoke, heat, or carbon monoxide alarms fitted with the momentary action push to test switch. This requirement is disadvantageous in that often two persons may not be available, as in the case of a dwelling occupied by a single owner or occupant, for fully testing the detection and warning functions of the interconnected alarm devices in the dwelling. Because of this, the interconnected smoke, heat, or carbon monoxide alarms would often only undergo the one-person detection function test. This testing is substandard as it does not prove that the common alarm communication between all the interconnected smoke, heat, or carbon monoxide alarms as previously described is working.

A further disadvantage of existing interconnected smoke, heat, or carbon monoxide alarms is that, even in situations where a second person is available to assist with testing, it is not often realised by occupants of dwellings that simply undertaking a detection test on each of the interconnected smoke, heat, or carbon monoxide alarms is not enough to prove that all the interconnected smoke, heat, or carbon monoxide alarms will activate and provide an audible fire warning in the event of a fire.

Disadvantages of Existing Interconnected Smoke Alarms for the Protection of Dwellings of Multi-Dwelling Residential Buildings or Separate Single Dwellings that are Leased and are not Owner Occupied The disadvantages of existing interconnected smoke, heat, or carbon monoxide alarms as previously described are not only relevant to single owner-occupied dwellings in which testing of the interconnected smoke, heat or carbon monoxide alarms is carried out by the single occupant of the dwelling. These disadvantages apply equally to other types of dwellings where testing of the interconnected smoke, heat, or carbon monoxide alarms are to be carried out jointly by dwelling occupants and by another party such as the owner of the dwelling, or the Body Corporation and/or the Real Estate Agent acting on the owner's behalf as explained further below:

Separate Single Leased Dwelling

In addition to the testing of interconnected smoke alarms by occupants of the dwelling, and for insurance purposes or for legal reasons, it is common for owners of separate single leased dwellings to arrange for the testing of dwelling's interconnected smoke, heat, or carbon monoxide alarms, usually through the relevant Real Estate Agent, at their own cost at least once a year and when there is a tenancy change.

The disadvantages of the testing required for existing interconnected smoke, heat, or carbon monoxide alarms of leased single dwellings are the same as those previously described for owner occupied dwellings, except that the dwellings that are leased have the added disadvantage that access is often limited, delayed or difficult to arrange.

Owner Occupied Dwellings of Multi-Dwelling Residential Buildings

The disadvantages of the testing required for interconnected smoke, heat, or carbon monoxide alarms of owner-occupied dwellings in multi-dwelling residential buildings are the same as those for separate single leased dwellings in that the testing is required to be undertaken by occupants of the dwelling on a regular basis as well as by an external party, the Body Corporation, for which access is often limited, delayed or difficult to arrange. The testing of interconnected smoke, heat, or carbon monoxide alarms in dwellings forming part of a multi-dwelling residential complex is required to ensure that all dwellings of the residential building have smoke, heat, or carbon monoxide alarms in full operational order.

Leased Dwellings of Multi-Dwelling Residential Buildings

The disadvantages of the testing for existing interconnected smoke, heat, or carbon monoxide alarms of leased dwellings in multi-dwelling residential buildings are the same as those for the testing of interconnected smoke, heat, or carbon monoxide alarms of owner-occupied dwellings in multi-dwelling residential buildings. However, in the case of leased dwellings, the regular testing of the interconnected smoke alarms is by the tenants instead of by the owner of the dwellings.

Examples of the Invention

It is an example of this invention to overcome the shortcomings of prior art interconnected fire alarm systems comprising of two or more compatible interconnected alarm devices such as smoke alarms, heat alarms or carbon monoxide alarms, in any combination, and with interconnections and power supplies of any type, so that the smoke, heat or carbon monoxide detection and warning functions of each of the alarm devices can be fully tested by one person, the system including alarm devices with ON and OFF test switches instead of momentary action test switches, and the smoke, heat, or carbon monoxide detection and warning functions of each of the system's interconnected alarm devices are tested by the following actions and verifications by a single person:

(1) operating the ON and OFF test switch of one of the interconnected alarm devices so that the alarm device enters and remains in test mode; and (2) verifying that the alarm device being tested activates in test mode to provide an audible fire warning; and (3) maintaining the alarm device in test mode and moving to each of the system's other interconnected alarm devices that are not being tested to verify that they all have been activated and are each providing an audible fire warning; and (4) going back to the interconnected alarm device in test mode and terminating the test by operating the ON and OFF test switch of the alarm device to return all of the system's interconnected alarm devices to their quiescent condition; and (5) repeating all the previously described actions and verifications for each of the system's remaining interconnected alarm devices so that they are tested in turn, one at a time, to result in the detection and warning functions of all of the system's alarm devices being fully tested and proven.

It is to be noted that the method of fully testing the detection and warning functions of the compatible alarm devices of an interconnected fire alarm system, wherein the alarm devices have ON and OFF test switches instead of momentary action test switches as previously described, is applicable to all interconnected fire alarm systems irrespective of the following:

The combination and mix of compatible alarm device types as long as the system's maximum number of interconnected alarm devices is not exceeded; and The type of power supply of each of the compatible alarm devices and whether the alarm devices are hard wired to an external power source or are battery operated; and Whether the interconnection between each of the interconnected compatible alarm devices is by hard wiring or is wireless.

The interconnected alarm device ON and OFF test switch previously described may vary in that the ON and OFF switch can be replaced by a momentary action test switch used in conjunction with a one-shot timer circuit to maintain the smoke alarm in test mode for a set period of time before automatically resetting to return the alarm device to its quiescent condition and terminating the test. This arrangement is designed to allow sufficient time for a single person testing the interconnected fire alarm system to verify that the interconnected alarm device in test mode has activated and is providing the required audible fire warning, and to also verify that the system's remaining interconnected alarm devices have been activated and that they are each producing an audible fire warning. At the expiry of the one-shot timer period, the system's remaining interconnected alarm devices can be tested in turn, one at a time, and the necessary actions and verifications completed by the single person as previously described.

It is also the example of this invention to provide an improved interconnected fire alarm system that can be tested by a single person who is able to ascertain, at the location of an alarm device being tested, that all the system's remaining interconnected alarm devices have activated, the system including:

(1) two or more compatible interconnected alarm devices with momentary action test switches such as smoke, heat and carbon monoxide alarms in any combination;

(2) said interconnected alarm devices that are hard wired to a power source and are interconnected by hard wiring or by wireless means for common alarm communication;

(3) each of said interconnected alarm devices having means for detecting that the alarm device has activated and is providing an audible fire warning, such as when the alarm device is tested or is in alarm mode; and (4) each of said interconnected alarm devices also having switching means which operates when it is detected that the alarm device has activated and is providing an audible fire warning; and (3) separate signal hard wiring means connecting all of the system's interconnected alarm devices; and (4) each of the interconnected alarm devices having further indicating means, such as a light emitting diode, connected to the said separate signal wiring means so that the said indicating means of all of the interconnected alarm devices are switched on by said switching means to provide an indication at each interconnected alarm devices when it is detected that all of the system's interconnected alarm devices are activated and are each providing an audible fire warning; and the smoke, heat, or carbon monoxide detection and warning functions of each of the system's interconnected alarm devices are fully tested by a single person:

(a) operating the momentary action test switch of one of the system's interconnected alarm devices so that the alarm device is in test mode; and (b) maintaining the said interconnected alarm device in test mode by continuing to push the test switch until the said indicating means activates to indicate that all of the system's interconnected alarm devices have activated and are each providing a fire warning; and (c) terminating the testing of the interconnected alarm device by releasing the pressure on the momentary action test switch of said interconnected alarm device when said indicating means have confirmed that all of the system's remaining alarm devices are activated; and (d) the single person repeating all the previously described actions and verifications for each of the system's remaining interconnected alarm devices when they are tested in turn, one at a time, to result in the detection and warning functions of all of the system's alarm devices being fully tested and proven.

It is to be noted that with the method and system described immediately above, the system's alarm devices can be hard wired for interconnection, or the interconnection of the alarm devices can be wireless. Furthermore, the system's alarm devices must be hard wired to the power source.

It is a further example of this invention to overcome the shortcomings of prior art interconnected fire alarm systems so that the smoke, heat, or carbon monoxide detection and warning functions of the system's alarm devices can be fully tested from one location by a single person who is able to ascertain, at the location where the tests are undertaken and without the single person requiring to have direct physical access to the system's alarm devices, that all of the system's remaining interconnected alarm devices have activated when any one of the system's alarm devices is being tested, the system including:

(1) two or more compatible interconnected alarm devices with remote test switches located at a control and test panel, and with each remote test switch individually hard wired to its respective alarm device so that each interconnected alarm device can be tested remotely when its remote test switch is operated; and (2) said interconnected alarm devices also individually hard wired to the control and test panel in order to receive electrical power and for common alarm communication between all of the system's alarm devices; and (4) said control and test panel including a power supply to power all of the system's alarm devices and all control and test panel circuits and indicators; and (5) said control and test panel also including connecting means for electrically connecting all the system's individual alarm devices interconnection hard wiring together for common alarm communication between all interconnected alarm devices so that they all activate and provide an audible fire warning if any of the interconnected alarm devices is tested or is in alarm mode; and (6) said control and test panel including additional detecting and indicating means for each of the system's interconnected alarm devices for detecting and indicating when an alarm device has been activated and is providing a fire warning signal; and the smoke, heat, or carbon monoxide detection and warning functions of each of the system's interconnected alarm devices are fully tested by a single person:

(a) operating the remote test switch of one of the system's interconnected alarm devices at the control and test panel so that the alarm device is activated to provide an audible fire warning and operate the control and test panel additional detecting and indicating means of the interconnected alarm device being tested; and (b) maintaining the said interconnected alarm device activated and in test mode to provide a signal to all the system's remaining interconnected alarm devices via the control and test panel connecting means and the interconnection wiring of each of the system's remaining interconnected alarm devices to cause them to activate and to each provide a fire warning signal; and (c) said control and test panel additional detecting and indicating means of each of the system's remaining alarm devices operating when each of the remaining interconnected alarm devices activates and provides an audible fire warning;

(d) terminating the testing of the said interconnected alarm device after the single person carrying out the test has confirmed that all the individual control and test panel detecting and indicating means have operated to indicate that all of the system's interconnected alarm devices have activated and are providing an audible fire warning; and (e) the single person repeating all the previously described actions and verifications for each of the remaining interconnected alarm devices when they are tested in turn, one at a time, to result in the detection and warning functions of all of the system's alarm devices being fully tested and proven.

It is to be noted that the interconnected fire alarm system previously described in this section of the specification comprises of interconnected alarm devices with hard wired interconnections, and that the control and test panel includes connecting means for electrically connecting all of the system's individual alarm devices interconnection hard wiring together for common alarm communication between all of the system's interconnected alarm devices so that they all activate and provide a fire warning if any of the interconnected alarm devices is tested or is in alarm mode. However, the next interconnected fire alarm system description is that of a similar system which makes use of alarm devices which are interconnected by wireless means, making the hard wiring for interconnection and the control and test panel connecting means redundant.

It is a therefore another example of this invention to provide an improved interconnected fire alarm system so that the smoke, heat, or carbon monoxide detection and warning functions of the system's alarm devices can be fully tested from one location by a single person who is able to ascertain, at the location where the tests are undertaken and without the single person requiring to have direct physical access to the system's alarm devices, that all of the system's remaining interconnected alarm devices have activated when any one of the system's alarm devices is being tested, the system including:

(1) two or more compatible interconnected alarm devices with remote test switches located at a control and test panel, and with each remote test switch individually hard wired to its respective alarm device so that each interconnected alarm device can be tested remotely when its remote test switch is operated; and (2) said interconnected alarm devices are interconnected for common alarm communication between all of the system's alarm devices by wireless means so that they all activate and provide an audible fire warning if any of the interconnected alarm devices is tested or is in alarm mode; and (3) said interconnected alarm devices being individually hard wired to the control and test panel in order to receive electrical power; and (4) said control and test panel including a power supply to power all of the system's alarm devices and all control and test panel circuits and indicators; and (5) said control and test panel including additional detecting and indicating means for each of the system's interconnected alarm devices for detecting and indicating when an alarm device has been activated and is providing a fire warning signal; and the smoke, heat, or carbon monoxide detection and warning functions of each of the system's interconnected alarm devices are fully tested by a single person:

(a) operating the remote test switch of one of the system's interconnected alarm devices at the control and test panel so that the alarm device is activated to provide an audible fire warning and operate the control and test panel additional detecting and indicating means of the interconnected alarm device being tested; and (b) maintaining the said interconnected alarm device activated and in test mode to provide a signal to all the system's remaining interconnected alarm devices via wireless means to cause them to activate and to each provide a fire warning signal; and (c) said control and test panel additional detecting and indicating means of each of the system's remaining alarm devices operating when each of the remaining interconnected alarm devices activates and provides a fire warning signal;

(d) terminating the testing of the said interconnected alarm device after the single person carrying out the test has confirmed that all the individual control and test panel detecting and indicating means have operated to indicate that all of the system's interconnected alarm devices have activated and are each providing an audible fire warning; and (e) the single person repeating all the previously described actions and verifications for each of the system's remaining interconnected alarm devices when they are tested in turn, one at a time, to result in the detection and warning functions of all of the system's alarm devices being fully tested and proven.

It is also another example of this invention to provide an improved interconnected fire alarm system so that the smoke, heat, or carbon monoxide detection and warning functions of the system's alarm devices can be fully tested by a single person carrying a portable standalone device that allows the person to ascertain, at the location where a system's alarm device is being tested, that all of the system's remaining interconnected alarm devices have activated when the alarm device is tested, the system including:

(1) two or more compatible interconnected alarm devices with hard wired interconnections and hard wired to a power source, with each of the interconnected alarm having the usual momentary action push to test switch; and (2) each of the system's alarm devices including a relay which operates when a higher alarm device current is detected when the alarm is activated, when the alarm is in test mode or in alarm mode, or when the alarm device is activated upon receipt of a signal, on the interconnect hard wiring, when another interconnected alarm device is in test mode or in alarm mode; and (3) an RF wireless transmitter, hard wired to the power source, and connected to the normally closed relay contacts of all of the system's interconnected alarm devices such that the transmitter operates and transmits a wireless RF signal when all the alarm device relays are energised and their respective normally closed relay contacts open; and (4) a standalone portable battery-operated RF receiver unit which, upon receipt of a wireless signal from the RF transmitter previously described, operates an electronic switch to turn on a light emitting diode to indicate that all the system's interconnected alarm devices have activated and are providing a fire warning; and the smoke, heat or carbon monoxide detection and warning functions of all of the system's alarm devices are fully tested by:

(a) the single person operating the momentary action push to test switch of one of the system's interconnected alarm devices whilst holding the portable RF receiver unit resulting in the alarm device alarm activating and providing a fire warning; and (b) the activation of the system's alarm devices resulting in all the alarm device relays to operate to open their respective normally closed contacts to turn on the system's RF transmitter; and (c) the single person observing that the light emitting diode LED of the portable battery-operated RF receiver unit operates to indicate that all of the system's alarm devices have activated and are providing a fire warning, when the portable RF receiver unit receives a wireless signal from the system's RF transmitter to cause its electronic switch to close; and (d) the single person terminating the testing of the interconnected alarm device and repeating all the previously described actions and verifications for each of the remaining interconnected alarm devices when they are tested in turn, one at a time, to result in all the detection and warning functions of all of the system's alarm devices being fully tested and proven.

It is to be noted that the improved interconnected fire alarm system can be achieved using alarm devices with wireless interconnections, in which case the system includes:

(1) two or more compatible interconnected alarm devices with wireless interconnections and hard wired to a power source, with each of the interconnected alarm having the usual momentary action push to test switch; and (2) each of the system's alarm devices including a relay which operates when a higher alarm device current is detected when the alarm device is activated, when the alarm device is in test mode or in alarm mode, or when the alarm device is activated upon receipt of a wireless interconnection signal, when another interconnected alarm device is in test mode or in alarm mode; and (3) an RF wireless transmitter, hard wired to the power source, and connected to the normally closed relay contacts of all of the system's interconnected alarm devices such that the transmitter operates and transmits a wireless RF signal when all the alarm device relays are energised and their respective normally closed relay contacts open; and (4) a standalone portable battery-operated RF receiver which, upon receipt of a wireless signal from the RF transmitter previously described, operates an electronic switch to turn on a light emitting diode to indicate that all the system's interconnected alarm devices have activated and are providing a fire warning; and the smoke, heat or carbon monoxide detection and warning functions of all of the system's alarm devices are fully tested by:

(a) the single person operating the momentary action push to test switch of one of the system's interconnected alarm devices whilst holding the portable test functions receiver unit resulting in the alarm device alarm activating and providing a fire warning; and (b) the activation of the system's alarm devices resulting in all the alarm device relays to operate to open their respective normally closed contacts to turn on the system's RF transmitter; and (c) the single person observing that the light emitting diode LED of the portable battery-operated RF receiver operates to indicate that all of the system's alarm devices have activated and are providing a fire warning, when the portable RF receiver receives a wireless signal from the system's RF transmitter to cause its electronic switch to close; and (d) the single person terminating the testing of the interconnected alarm device and repeating all the previously described actions and verifications for each of the remaining interconnected alarm devices when they are tested in turn, one at a time, to result in all the detection and warning functions of all of the system's alarm devices being fully tested and proven.

Description of the Embodiments of the Invention

Embodiments of the invention are described in detail in the following subsections of the specification and are as illustrated by the accompanying drawings. The drawings, however, are merely illustrative of how the invention can be put into effect and are not to be understood as limiting on the invention.

First Embodiment

With this embodiment, as well as will all subsequent embodiments, and for simplicity, the interconnected fire alarm system includes only smoke alarms. For this reason the system is referred to in the description as being an interconnected smoke alarm system, whilst the system's interconnected alarm devices are referred to as interconnected smoke alarms. Such systems can include other types of compatible alarm devices such as heat and carbon monoxide alarms in any combination, as long as the maximum number of compatible smoke, heat, or carbon monoxide alarms that are able to be interconnected is not exceeded.

Figure 10:
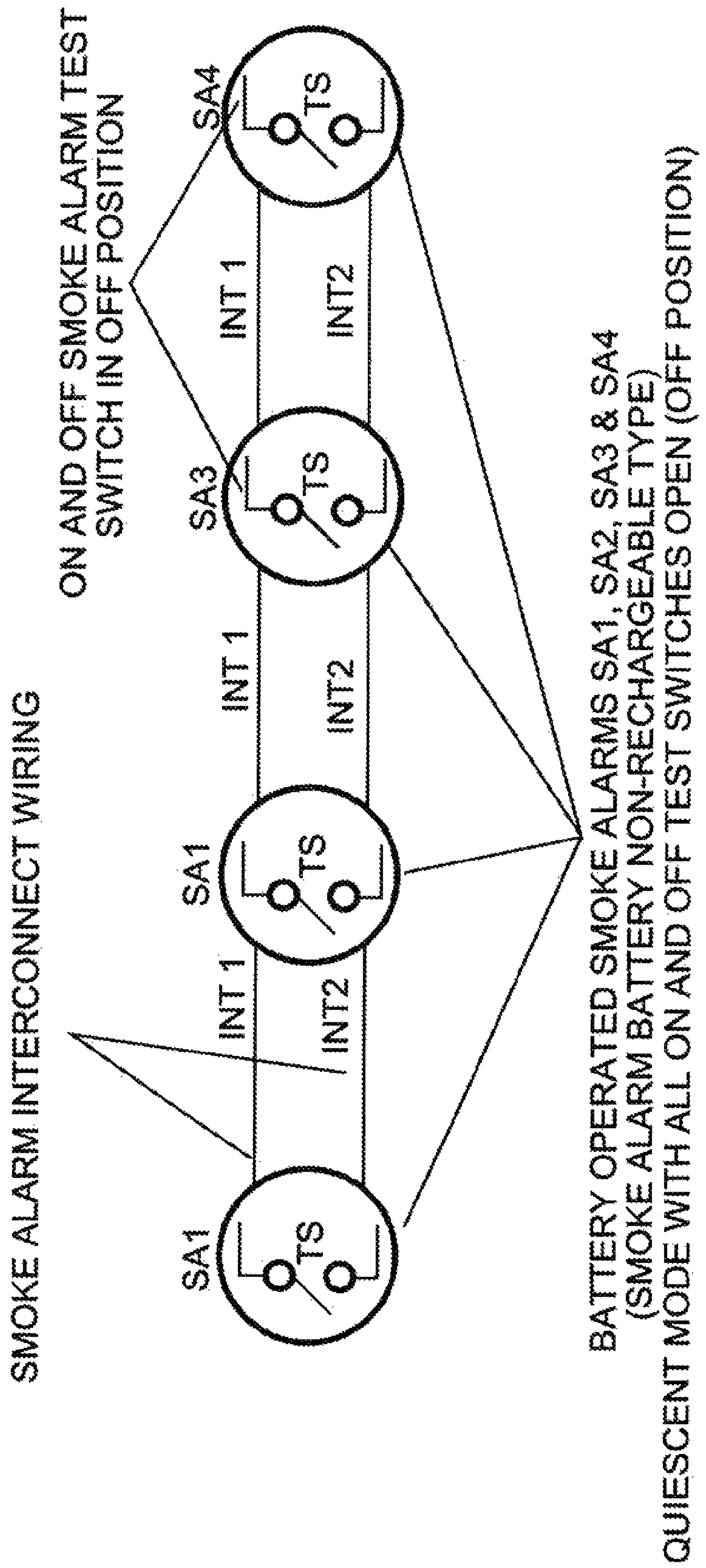
FIG. 10 is a wiring diagram for a smoke alarm system that includes four battery operated interconnected smoke alarms SA1, SA2, SA3 and SA4, with each smoke alarm having a non-rechargeable battery.

FIG. 10 is a wiring diagram for a smoke alarm system comprising of four battery operated interconnected smoke alarms SA1, SA2, SA3 and SA4, with each smoke alarm having a non-rechargeable battery. The system's smoke alarms are interconnected by a two core hard wiring comprising of conductors INT1 and INT2. As depicted by FIG. 10, each of the system's smoke alarms have their own ON and OFF test switch TS instead of the usual momentary action push to test switch of prior art smoke alarms. The test switch TS of each of the system's smoke alarms can be either set to the OFF or open position when the smoke alarms are in quiescent mode or set to the ON or closed position when the smoke alarms are being tested.

Figure 11:
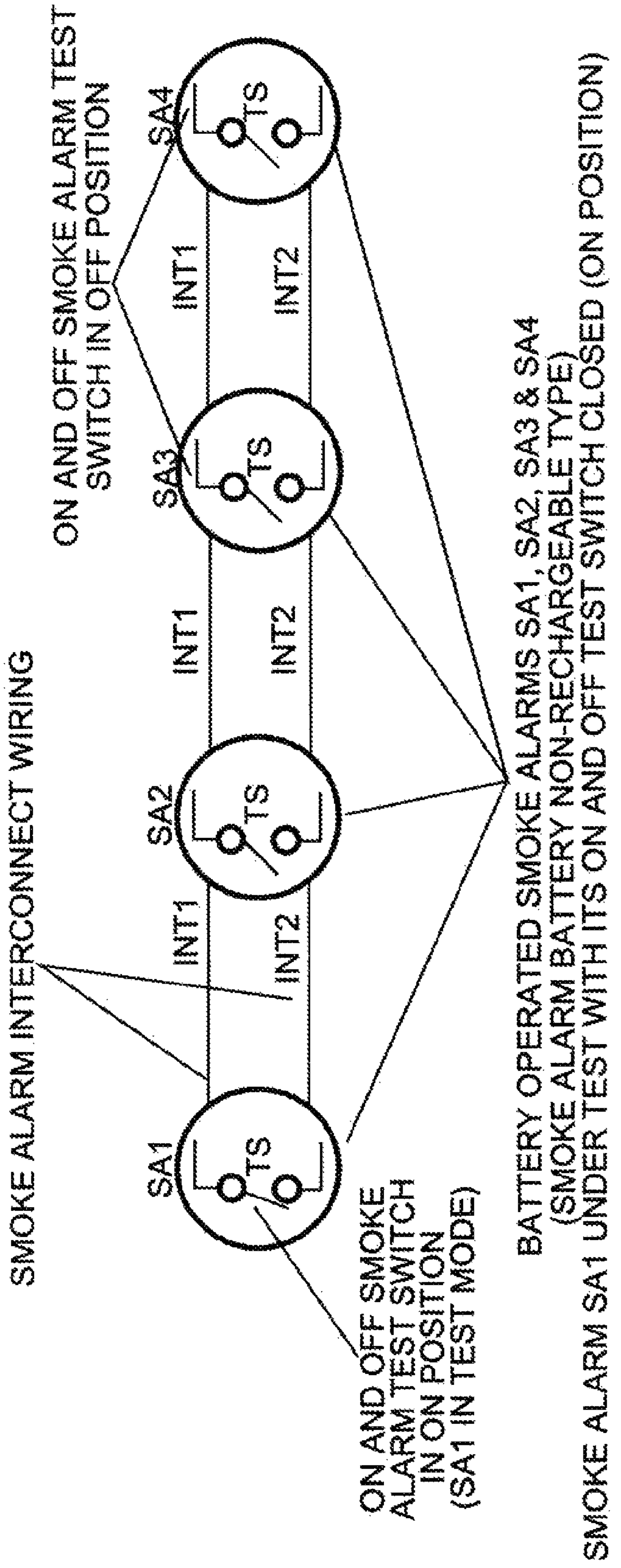
FIG. 11 is a wiring diagram of the smoke alarm system when smoke alarm SA1 is being tested.

FIG. 11 is a wiring diagram of the smoke alarm system when smoke alarm SA1 is being tested. As depicted by FIG. 11, when smoke alarm SA1 is tested, the smoke alarm test switch TS is operated to set it to the ON or closed position.

In accordance with FIG. 10 and FIG. 11, the interconnected smoke alarm system is tested by the following actions and verifications by a single person:

(1) operating the ON and OFF test switch TS of one of the interconnected smoke alarms so that the smoke alarm enters and remains in test mode; and (2) verifying that the smoke alarm being tested activates in test mode to provide an audible fire warning; and (3) maintaining the smoke alarm in test mode by leaving the smoke alarm test switch TS in the closed position, and moving to each of the remaining interconnected smoke alarms that are not in test mode to verify that they all have been activated via the interconnection hard wiring and are each producing an audible fire warning; and (4) going back to the interconnected smoke alarm SA1 in test mode and terminating the smoke alarm test by operating the ON and OFF test switch TS of smoke alarm SA1 to return all of the system's interconnected smoke alarms to their quiescent condition; and (5) repeating all the previously described actions and verifications for each of the remaining interconnected smoke alarms SA2, SA3, and SA4 when they are tested in turn, one at a time, to prove and verify that:

(a) each of the system's interconnected smoke alarms SA1, SA2, SA3 and SA4 is able to activate, when tested, to provide an audible fire warning; and (b) each of the system's smoke alarms SA1, SA2, SA3 and SA4 is able to activate, when tested one at a time, to provide a signal via the interconnection hard wiring to cause all of the system's remaining interconnected smoke alarms to activate to also provide an audible fire warning; and (c) each of the system's smoke alarms SA1, SA2, SA3 and SA4 is able to activate upon receipt of a signal via the interconnection wiring to provide an audible fire warning, when any one of the system's remaining interconnected smoke alarms is tested one at a time.

Power Supply Arrangement of the First Embodiment

It is to be noted that although the first embodiment includes battery operated interconnected smoke alarms, the change of the momentary action push to test switch to an ON and OFF test switch, and the testing method described for the first embodiment, are applicable to interconnected smoke alarm systems with hard wired power wiring and hard wired interconnection. These include, but are not limited to, the following:

Dual supply interconnected smoke alarms with non-rechargeable battery and powered directly from mains power supply, and with hard wired interconnections; and Dual supply interconnected smoke alarms with rechargeable battery powered and directly from mains power supply, and with hard wired interconnection; and Dual supply interconnected smoke alarms with non-rechargeable battery and powered from an external power supply derived from mains power supply, and with hard wired interconnection; and Single supply interconnected smoke alarms with hard wired interconnection and a standby rechargeable battery backup supply, powered from an external power supply derived from mains power supply.

Interconnection Arrangement of the First Embodiment

Figure 12:
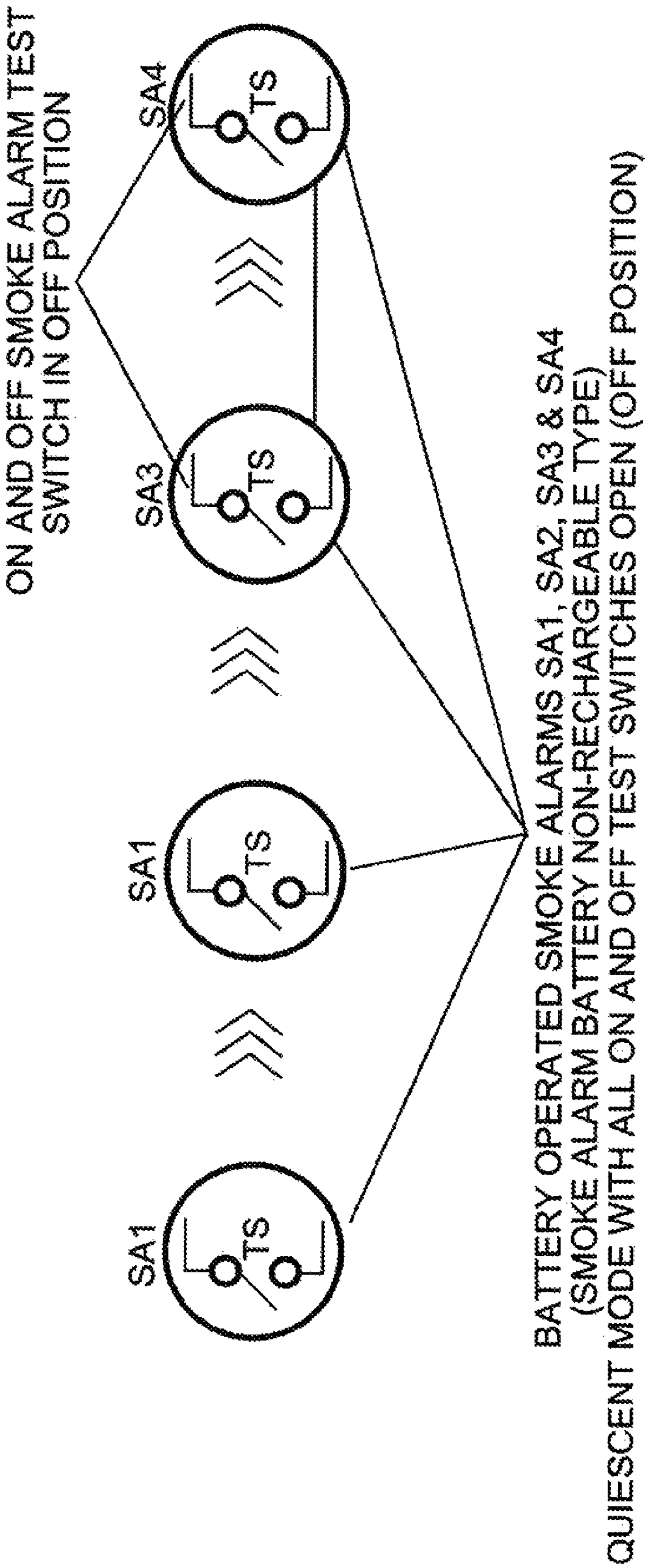
FIG. 12 illustrates a smoke alarm system that includes battery operated smoke alarms that are interconnected by wireless means.
Figure 13:
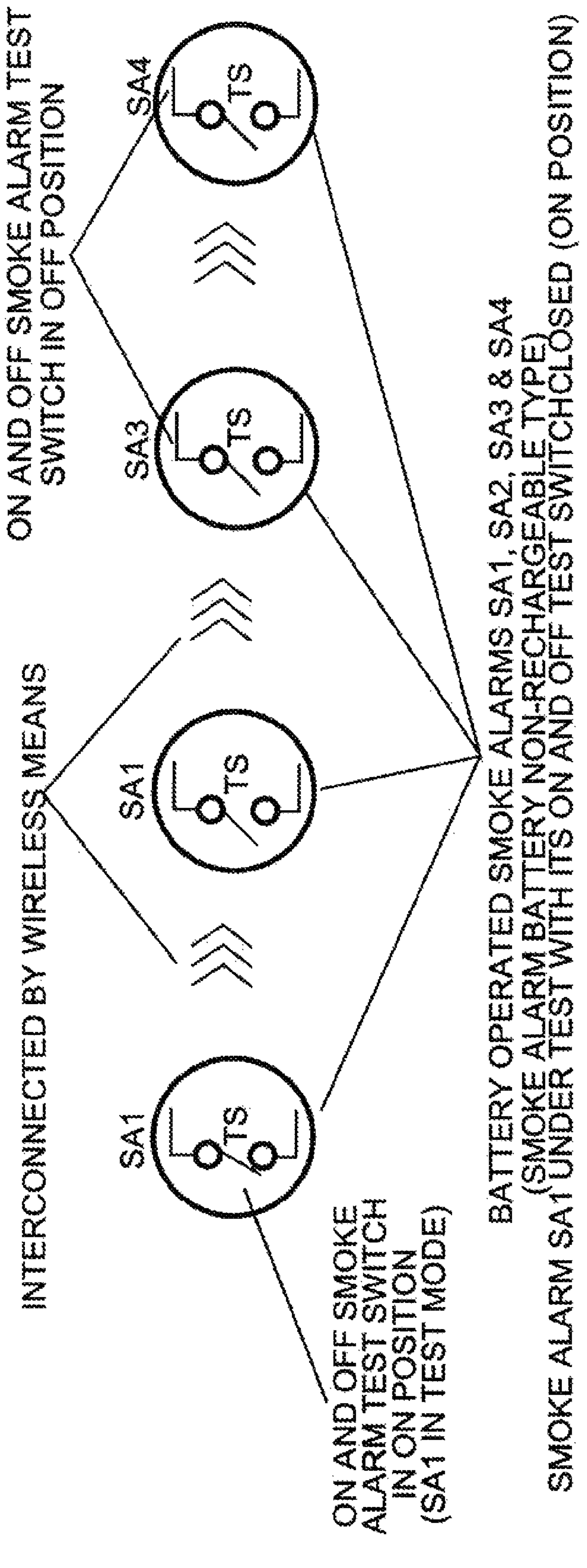
FIG. 13 illustrates a smoke alarm system that includes battery operated smoke alarms that are interconnected by wireless means.

Although the first embodiment includes interconnected smoke alarms with hard wired interconnections, the change of the momentary action push to test switch to an ON and OFF test switch, and the testing method described for the first embodiment, are applicable to interconnected smoke alarm systems with smoke alarms with interconnections by wireless means and with power supply arrangements of any type. As an example, FIG. 12 and FIG. 13 depict the smoke alarm system previously described for the first embodiment, and as depicted by FIG. 10 and FIG. 11, with the exception that FIG. 12 and FIG. 13 include battery operated smoke alarms that are interconnected by wireless means.

Number of Smoke Alarms Interconnected

It is also to be noted that, although the interconnected smoke alarm system of the first embodiment includes four smoke alarms, the number of smoke alarms in such systems is only limited by the maximum number of compatible smoke alarms that can be interconnected. This is typically around 12, but some brands are able to have substantially higher numbers of smoke alarms that can be interconnected for common alarm communication.

Second Embodiment

Figure 14:
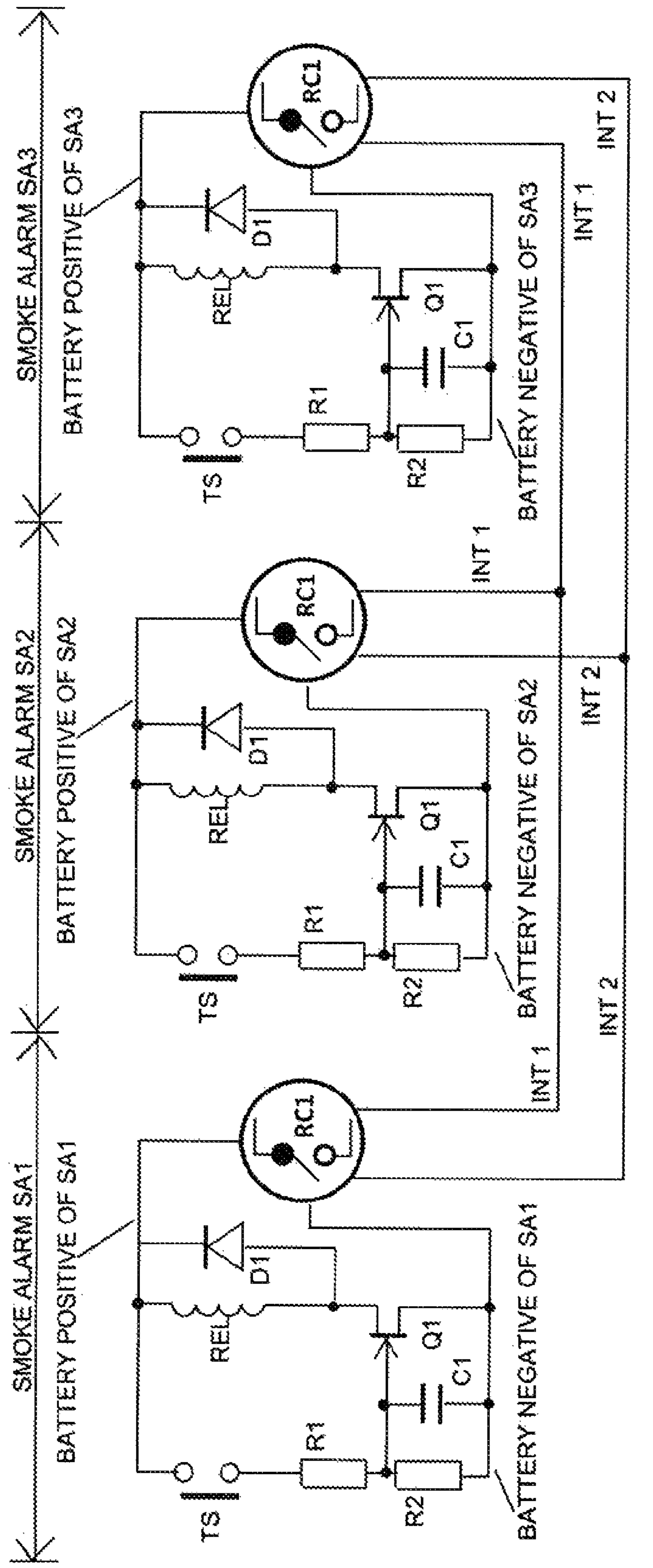
FIG. 14 is a wiring diagram for a smoke alarm system that includes three battery operated interconnected smoke alarms SA1, SA2 and SA3, with each smoke alarm having a non-rechargeable battery.

FIG. 14 is a wiring diagram for a smoke alarm system comprising of three battery operated interconnected smoke alarms SA1, SA2 and SA3, with each smoke alarm having a non-rechargeable battery. The system's smoke alarms are interconnected by a two core hard wiring comprising of conductors INT1 and INT2. As depicted by FIG. 14, in each of the system's smoke alarms, the usual normally open push to test switch has been replaced by a normally open contact of the smoke alarm relay REL. This relay is turned on for a set period of time, when the one-shot timer circuit comprising of resistors R1 and R2, capacitor C1 and FET transistor Q1, is operated by the closure of the normally open push to test switch TS of the smoke alarm for a short period of time. The operation of the timer circuit is as follows:

The value of resistor R2 is much higher than that of resistor R1 and operating the normally open push to test switch TS of the smoke alarm for a short period of time results in capacitor C1 being rapidly charged, through resistor R1, to a voltage which is very near the battery supply voltage, usually around 9 volts.

The voltage across capacitor C1 is applied to the Gate of FET transistor Q1, and as this voltage is higher than the approximately 2 volts required to turn on the FET transistor, the smoke alarm relay REL operates to close the smoke alarm relay contact RC1.

The smoke alarm relay contact RC1 is directly substituted for the usual momentary action push to test normally open test switch of prior art smoke alarms, and its closure causes the smoke alarm to be tested.

Charging of capacitor C1 is terminated when the push to test switch TS is released, at which time the capacitor starts to discharge through resistor R2 having a high resistance value that ensures that the voltage applied the Gate of FET transistor Q1 remains above approximately 2 volts for a predetermined period. Thus, the relay operates for the predetermined period to keep the smoke alarm relay contact RC1 closed to maintain the smoke alarm in test mode.

At the end of the predetermined period, when the voltage at the Gate of FET transistor Q1 drops below approximately 2 volts, the FET transistor turns off and the relay is de-energised to cause the smoke alarm relay contact RC1 to open, thus ending the smoke alarm test.

The values of resistor R2 and capacitor C1 are chosen so that the predetermined period of the timer is sufficient for all the actions and verifications, required by a single person testing the interconnected smoke alarm system, to be undertaken.

Diode D1 across each of the system's interconnected smoke alarm relay coil is a protection diode to prevent circuitry damage due to back emf generated when the relay is de-energised.

Referring to FIG. 14, the interconnected smoke alarm system is tested by the following actions and verifications by a single person:

(1) operating the momentary action push to test normally open test switch TS of one of the interconnected smoke alarms so that the smoke alarm enters and remains in test mode for a predetermined period of time; and (2) verifying that the smoke alarm being tested activates in test mode to provide an audible fire warning; and (3) during the predetermined test mode period, moving to each of the remaining interconnected smoke alarms that are not in test mode to verify that they all have been activated via the interconnection wiring and are each producing an audible fire warning; and (4) waiting for the predetermined test mode period to end, and repeating all the previously described actions and verifications for each of the remaining interconnected smoke alarms when they are tested in turn, one at a time, to prove and verify that:

(a) each of the system's interconnected smoke alarm is able to activate, when tested, to provide an audible fire warning; and (b) each of the system's smoke alarms is able to activate, when tested, to provide a signal via the interconnection wiring to cause all of the system's remaining interconnected smoke alarms to activate to also provide an audible fire warning; and (c) each of the system's smoke alarms is able to activate upon receipt of a signal via the interconnection wiring to provide an audible fire warning when any one of the system's remaining interconnected smoke alarm is tested.

As previously noted for the first embodiment, although the second embodiment of this invention includes battery operated interconnected smoke alarms, the testing method used in the second embodiment, is applicable to interconnected smoke alarm system with power supply systems of any type. Furthermore, the interconnected smoke alarm system of the second embodiment of this invention can include more that 3 smoke alarms, and the number of smoke alarms in such systems is only limited by the maximum number of smoke alarms that can be interconnected as specified by Manufacturers.

Interconnection Arrangement of the Second Embodiment

Figure 15:
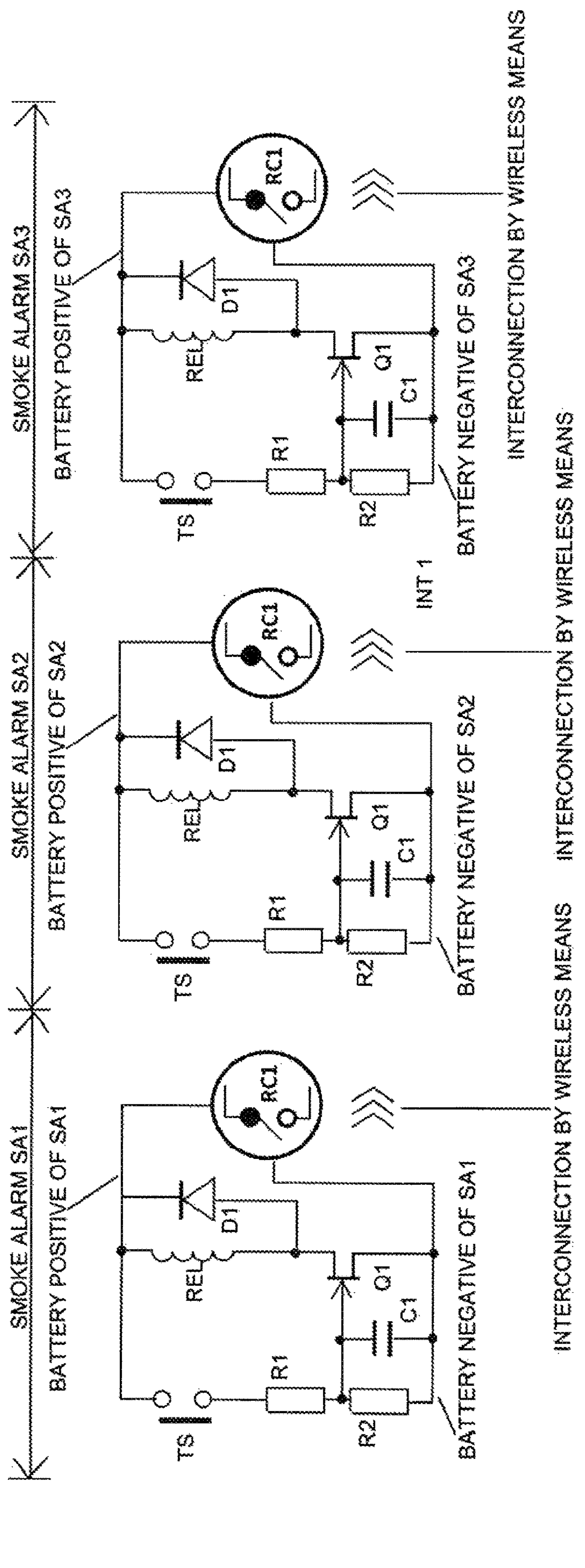
FIG. 15 illustrates a smoke alarm system that includes battery operated smoke alarms that are interconnected by wireless means.

Although the first embodiment includes interconnected smoke alarms with hard wired interconnections, the change of the smoke alarm momentary action push to test switch to a the normally open contact of a timer-controlled relay test switch, and the testing method described for the second embodiment, are applicable to interconnected smoke alarm systems with smoke alarms with interconnections by wireless means and with power supply arrangements of any type. As an example, FIG. 15 depicts the smoke alarm system previously described for the second embodiment, and as depicted by FIG. 14, with the exception that FIG. 15 includes battery operated smoke alarms that are interconnected by wireless means.

Third Embodiment

Figure 16:
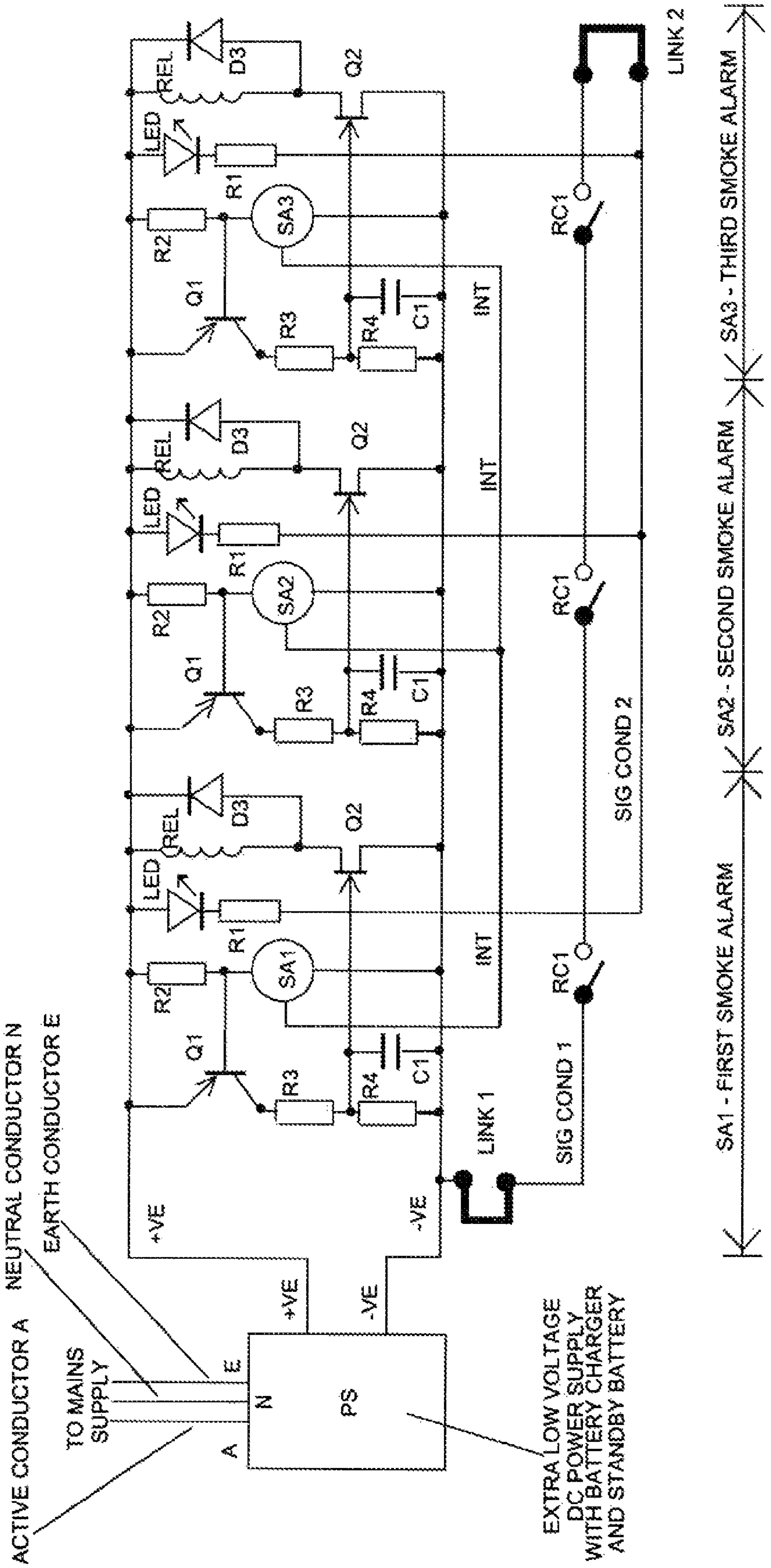
FIG. 16 is a wiring diagram for such a smoke alarm system that includes three interconnected smoke alarms SA1, SA2 and SA3, and the system is powered by hard wiring to an external extra low voltage battery backed DC power supply PS derived from mains power supply, and the smoke alarm interconnections are also hard wired.

The third embodiment of the invention provides an improved interconnected smoke alarm system that allows a single person to operate the momentary action test switch of an interconnected smoke alarm, and to ascertain that all interconnected smoke alarms have activated and are providing a fire warning, whilst the single person remains at the location of the smoke alarm in test mode. FIG. 16 is a wiring diagram for such a smoke alarm system comprising of three interconnected smoke alarms SA1, SA2 and SA3, and the system is powered by hard wiring to an external extra low voltage battery backed DC power supply PS derived from mains power supply, and the smoke alarm interconnections are also hard wired. The interconnected smoke alarm system is wired as follows:

Two conductors, namely the +VE and the −VE power supply conductors, connect the external extra low voltage DC power supply PS to all the system's interconnected smoke alarms.

Similarly, the interconnect conductor INT connects all of the system's smoke alarms for common alarm communication between all of the system's interconnected smoke alarms when a smoke alarm is in alarm mode or in test mode.

Two conductors, SIG COND 1 and SIG COND 2, are used to connect all of the system's interconnected smoke alarms as depicted by FIG. 16. SIG COND 1 conductor is linked to the −VE power supply conductor at the location of the first of the system's interconnected smoke alarm, SA1, and SIG COND 1 conductor is linked to SIG COND 2 conductor at the location of the last of the system's interconnected smoke alarm, SA3.

The relay REL of each of the system's interconnected smoke alarms has a normally open relay contact RC1. The relay contacts RC1 of all the interconnected smoke alarms are connected in series by SIG COND 1 conductor as depicted by FIG. 16.

Referring to FIG. 16, and with the linking arrangements at the first and last of the system's smoke alarms, and with all smoke alarm relay contacts RC1 connected in series by conductor SIG COND 1, it can be seen that conductor SIG COND 2 is electrically connected to the −VE power supply conductor only when the smoke alarm relay REL of each of the interconnected smoke alarms have operated to close all the series connected normally open relay contacts RC1.

Referring to FIG. 16, each of the interconnected smoke alarm relays operates when the smoke alarm current through resistor R2 causes sufficient voltage to be developed to turn on the PNP bipolar transistor Q1. This condition is satisfied when the smoke alarm draws a higher than quiescent current when it is activated to provide the audible fire warning in alarm mode, in test mode, or when the smoke alarm activates upon receipt of a signal via the interconnect hard wiring INT due to another interconnected smoke alarm being in alarm or test mode.

As PNP bipolar transistor Q1 turns on, capacitor C1 of the smoke alarm is charged via resistor R3 and this voltage is applied to the Gate of FET transistor Q2. When the voltage applied to the Gate of transistor Q2 reaches approximately 2 volts, the transistor turns on and the smoke alarm relay operates to close its contact RC1.

The closure of all the smoke alarm relay contacts RC1 provides a closed path to the −VE supply conductor and current flows through all the smoke alarm light emitting diodes LED to indicate, at each smoke alarm location, that all the interconnected smoke alarms have activated and are each providing an audible fire signal. It is to be noted that, if one of the system's smoke alarms is faulty and fails to activate when a smoke alarm test is carried out, all the light emitting diodes LED of the system's smoke alarms will not operate as conductor SIG COND 2 will not be electrically connected to the system's-VE power supply conductor. This is due to the relay REL of the faulty smoke alarm remaining de-energised with its contact RC1 also remaining open.

At the end of the test mode or the alarm mode, all the system's smoke alarms return to their quiescent mode with the quiescent current of each smoke alarm through their respective Resistor R2 being insufficient to turn their respective bipolar transistor Q1 on. Under these conditions, each of the interconnected smoke alarm capacitor C1 rapidly discharges through their respective resistor R4 and Q2 is turned off and the relay REL is de-energised.

De-energisation of relays REL results in all the interconnected smoke alarm relay contacts RC1 to open to disconnect conductor SIG COND2 from the −VE power supply and the smoke alarm light emitting diode LED of each of the smoke alarms turns off.

Diode D3 across the coil of each of the system's interconnected smoke alarms is for the protection of the smoke alarm electronic circuit from damage by back e.m.f. when the smoke alarm relays are de-energised.

It is to be noted that with the third embodiment of the invention, each of the system's interconnected smoke alarms includes the usual momentary action push to test switch. Again referring to FIG. 16, the system includes:

(1) three smoke alarms SA1, SA2 and SA3, each with detecting means, comprising of transistor Q1 and Resistor R2, for detecting that the smoke alarm has activated and is providing an audible fire warning, such as when the smoke alarm is tested, or when the smoke alarm is an alarm mode, or when the smoke alarm has received a signal provided via the interconnect conductor INT when another smoke alarm is tested or is in alarm mode; and (2) additional signal wiring means comprising of conductors SIG COND 1 and SIG COND 2 connecting all of the system's interconnected smoke alarms; and (3) each interconnected smoke alarm having switching means comprising of Resistor R3, Capacitor C1, Transistor Q2 and relay REL, to close the smoke alarm normally open relay contact RC1 when it is detected that the smoke alarm has activated and is providing an audible fire warning; and (4) the additional signal wiring means providing a closed signal path to the −VE supply terminal comprising of conductors SIG COND 1 and SIG COND 2 to electrically connect all of the system's interconnected smoke alarms when all the smoke alarm relay contacts RC1 are closed and all smoke alarms have activated and are each providing an audible fire warning; and (5) each interconnected smoke alarm having additional indicating means comprising of a light emitting diode LED and Resistor R1 connected to the additional signal wiring means comprising of conductors SIG COND 1 and SIG COND 2 which, when providing a closed signal path when all of the system's interconnected smoke alarms are activated, causes the light emitting diode LED of each smoke alarm to operate; and the smoke detection and warning functions of each of the system's interconnected smoke alarms SA1, SA2 and SA3 are fully tested by:

(a) a single person operating the momentary action push to test switch of one of the system's interconnected smoke alarms so that the smoke alarm is in test mode; and (b) the single person maintaining the interconnected smoke alarm in test mode by continuing to operate its test switch until the additional light emitting diode LED of the smoke alarm being tested operates to indicate that all of the interconnected smoke alarms have activated and are each providing a fire warning; and (c) the single person terminating the testing of the interconnected smoke alarm by releasing the pressure on the test switch of the smoke alarm; and (d) the single person repeating all the previously described actions and verifications for each of the remaining interconnected smoke alarms when they are tested in turn, one at a time, to result in the detection and warning functions of all of the system's alarm devices being fully tested and proven.

Although the third embodiment of this invention includes an external extra low voltage power supply with battery charger and standby rechargeable battery, the smoke alarm system power supply can be of any type previously described in this specification. Furthermore, the testing method of the third embodiment is also applicable to interconnected smoke alarm systems with power supply systems of any type.

Interconnection Arrangement of the Second Embodiment

Figure 17:
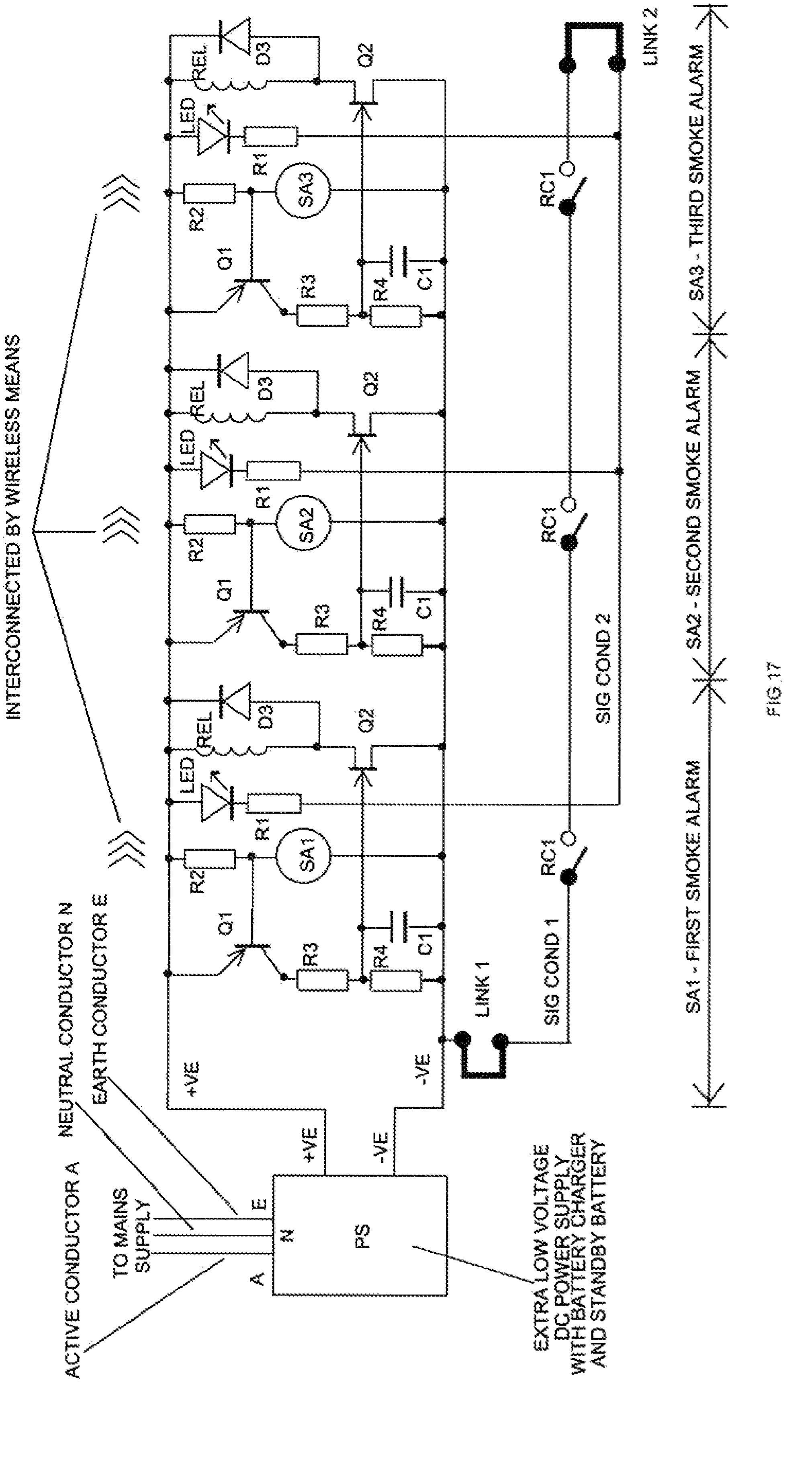
FIG. 17 is a wiring diagram for a smoke alarm system that includes three interconnected smoke alarms SA1, SA2 and SA3, and the system is powered by hard wiring to an external extra low voltage battery backed DC power supply PS derived from mains power supply.

Although the third embodiment of this invention includes interconnected smoke alarms with hard wired interconnections, these smoke alarms can be substituted with smoke alarms with wireless interconnections as depicted by FIG. 17 without any change in the testing method.

Thus, FIG. 17 is a wiring diagram for a smoke alarm system comprising of three interconnected smoke alarms SA1, SA2 and SA3, and the system is powered by hard wiring to an external extra low voltage battery backed DC power supply PS derived from mains power supply. The smoke alarm interconnections are by wireless means and the interconnected smoke alarm system is wired as follows:

Two conductors, namely the +VE and the −VE power supply conductors, connect the external extra low voltage DC power supply PS to all the system's interconnected smoke alarms.

Similarly, the smoke alarms are interconnected by wireless means for common alarm communication between all of the system's interconnected smoke alarms when any one or more smoke alarm is in alarm mode or in test mode.

Two conductors, SIG COND 1 and SIG COND 2, are used to connect all of the system's interconnected smoke alarms as depicted by FIG. 17. SIG COND 1 conductor is linked to the −VE power supply conductor at the location of the first of the system's interconnected smoke alarm, SA1, and SIG COND 1 conductor is linked to SIG COND 2 conductor at the location of the last of the system's interconnected smoke alarm, SA3.

The relay REL of each of the system's interconnected smoke alarms has a normally open relay contact RC1. The relay contacts RC1 of all the interconnected smoke alarms are connected in series by SIG COND 1 conductor as depicted by FIG. 17.

Referring to FIG. 17, and with the linking arrangements at the first and last of the system's smoke alarms, and with all smoke alarm relay contacts RC1 connected in series by conductor SIG COND 1, it can be seen that conductor SIG COND 2 is electrically connected to the −VE power supply conductor only when the smoke alarm relay REL of each of the interconnected smoke alarms have operated to close all the series connected normally open relay contacts RC1.

Referring to FIG. 17, each of the interconnected smoke alarm relays operates when the smoke alarm current through resistor R2 causes sufficient voltage to be developed to turn on the PNP bipolar transistor Q1. This condition is satisfied when the smoke alarm draws a higher than quiescent current when it is activated to provide the audible fire warning in alarm mode, in test mode, or when the smoke alarm activates upon receipt of a signal via the wireless means due to another interconnected smoke alarm being in alarm or test mode.

As PNP bipolar transistor Q1 turns on, capacitor C1 of the smoke alarm is charged via resistor R3 and this voltage is applied to the Gate of FET transistor Q2. When the voltage applied to the Gate of transistor Q2 reaches approximately 2 volts, the transistor turns on and the smoke alarm relay operates to close its contact RC1.

The closure of all the smoke alarm relay contacts RC1 provides a closed path to the −VE supply conductor and current flows through all the smoke alarm light emitting diodes LED to indicate, at each smoke alarm location, that all the interconnected smoke alarms have activated and are each providing an audible fire signal. It is to be noted that, if one of the system's smoke alarms is faulty and fails to activate when a smoke alarm test is carried out, all the light emitting diodes LED of the system's smoke alarms will not operate as conductor SIG COND 2 will not be electrically connected to the system's-VE power supply conductor. This is due to the relay REL of the faulty smoke alarm remaining de-energised with its contact RC1 also remaining open.

At the end of the test mode or the alarm mode, all the system's smoke alarms return to their quiescent mode with the quiescent current of each smoke alarm through their respective Resistor R2 being insufficient to turn their respective bipolar transistor Q1 on. Under these conditions, each of the interconnected smoke alarm capacitor C1 rapidly discharges through their respective resistor R4 and Q2 is turned off and the relay REL is de-energised.

De-energisation of relays REL results in all the interconnected smoke alarm relay contacts RC1 to open to disconnect conductor SIG COND2 from the −VE power supply and the smoke alarm light emitting diode LED of each of the smoke alarms turns off.

Diode D3 across the coil of each of the system's interconnected smoke alarms is for the protection of the smoke alarm electronic circuit from damage by back e.m.f when the smoke alarm relays are de-energised.

It is to be noted that, as with the previously described third embodiment that includes smoke alarms with hard wired interconnections, with the version of this embodiment that includes smoke alarms with wireless interconnections, each of the system's smoke alarms has the usual momentary action push to test switch.

Again Referring to FIG. 16, the System Includes:

(1) three smoke alarms SA1, SA2 and SA3, each with detecting means, comprising of transistor Q1 and Resistor R2, for detecting that the smoke alarm has activated and is providing an audible fire warning, such as when the smoke alarm is tested, or when the smoke alarm is an alarm mode, or when the smoke alarm has received a signal provided by wireless means when another smoke alarm is tested or is in alarm mode; and (2) additional signal wiring means comprising of conductors SIG COND 1 and SIG COND 2 connecting all of the system's interconnected smoke alarms; and (3) each interconnected smoke alarm having switching means comprising of Resistor R3, Capacitor C1, Transistor Q2 and relay REL, to close the smoke alarm normally open relay contact RC1 when it is detected that the smoke alarm has activated and is providing an audible fire warning; and (4) the additional signal wiring means providing a closed signal path to the −VE supply terminal comprising of conductors SIG COND 1 and SIG COND 2 to electrically connect all of the system's interconnected smoke alarms when all the smoke alarm relay contacts RC1 are closed and all smoke alarms have activated and are each providing an audible fire warning; and (5) each interconnected smoke alarm having additional indicating means comprising of a light emitting diode LED and Resistor R1 connected to the additional signal wiring means comprising of conductors SIG COND 1 and SIG COND 2 which, when providing a closed signal path when all of the system's interconnected smoke alarms are activated, causes the light emitting diode LED of each smoke alarm to operate; and the smoke detection and warning functions of each of the system's interconnected smoke alarms SA1, SA2 and SA3 are fully tested by:

(a) a single person operating the momentary action push to test switch of one of the system's interconnected smoke alarms so that the smoke alarm is in test mode; and (b) the single person maintaining the interconnected smoke alarm in test mode by continuing to operate its test switch until the additional light emitting diode LED of the smoke alarm being tested operates to indicate that all of the interconnected smoke alarms have activated and are each providing a fire warning; and (c) the single person terminating the testing of the interconnected smoke alarm by releasing the pressure on the test switch of the smoke alarm; and (d) the single person repeating all the previously described actions and verifications for each of the remaining interconnected smoke alarms when they are tested in turn, one at a time, to result in the detection and warning functions of all of the system's alarm devices being fully tested and proven.

Fourth Embodiment

Figure 18:
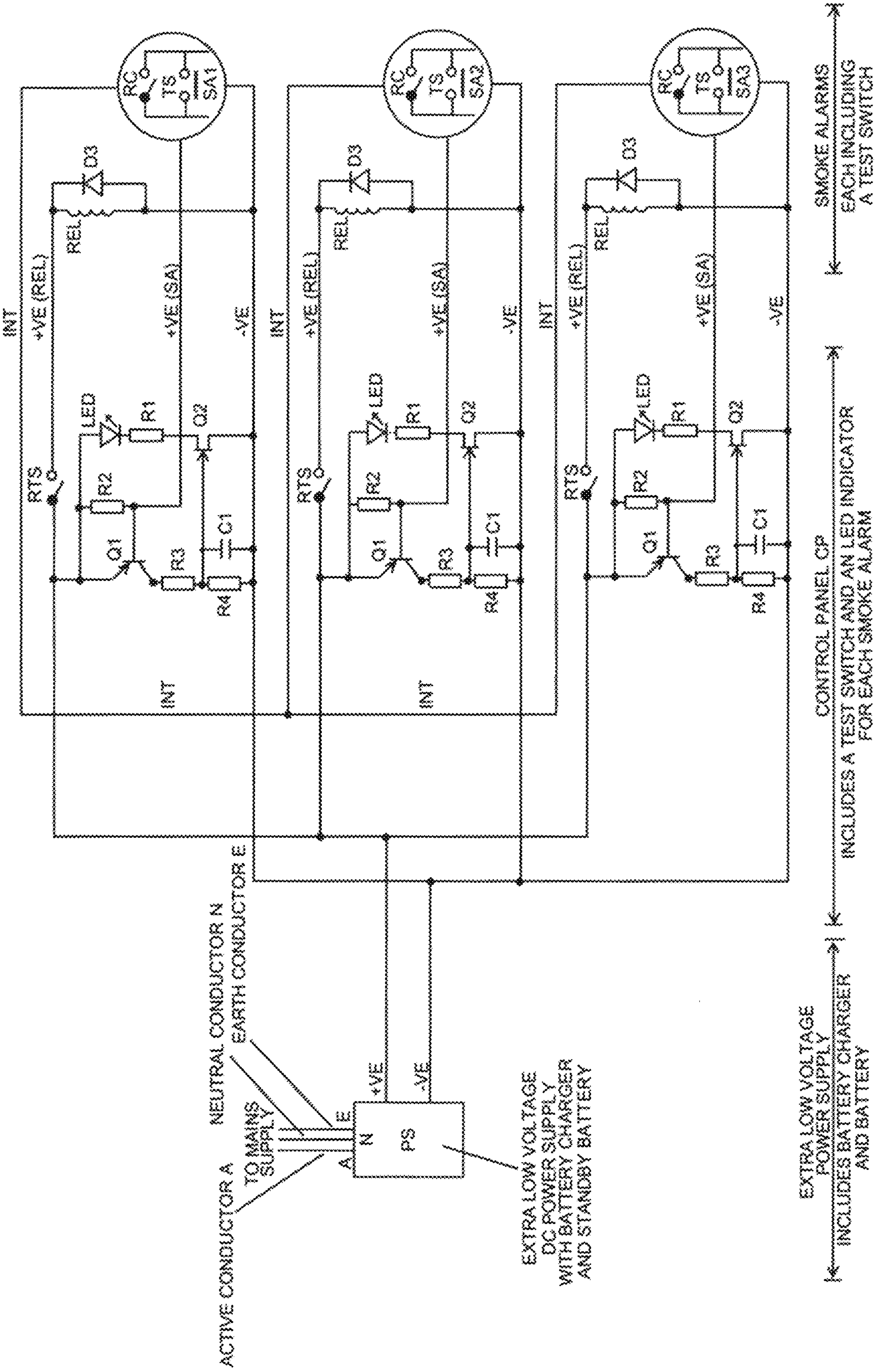
FIG. 18 is a wiring diagram for a smoke alarm system comprising of three interconnected smoke alarms able to be fully tested by a single person.

The fourth embodiment is as depicted by FIG. 18, which is the wiring diagram for a smoke alarm system comprising of three interconnected smoke alarms able to be fully tested by a single person, the smoke alarm system including:

Three interconnected smoke alarms SA1, SA2, and SA3, each with an additional smoke alarm relay REL having normally open relay contact RC connected in parallel with the usual normally open contact of the momentary action smoke Alarm push to test switch TS. With this arrangement, each of the system's interconnected smoke alarms can be tested by either operating the smoke alarm push to test switch TS locally, or by operating the smoke alarm relay REL remotely by operating a normally open remote smoke alarm test switch RTS. When the remote smoke alarm test switch RTS is operated, it has the same result as when the smoke alarm local momentary action push to test switch TS is operated as the relay contact RC is connected in parallel with the contact of switch TS.

A diode D3 across the coil of each of the system's interconnected smoke alarm relay REL is for the protection of the smoke alarm electronic circuit from damage by back e.m.f when the smoke alarm relays are de-energised.

A 4-core cable, one for each of the system's interconnected smoke alarms connecting each smoke alarm to a Control Panel CP, the 4-core cable including the following conductors:

1. a hard wired smoke alarm-VE power supply conductor.
2. a hard wired smoke alarm +VE power supply conductor.
3. a hard wired smoke alarm INT interconnect conductor for common alarm communication between all the system's smoke alarms when any of the system's smoke alarms is tested or is in alarm mode.
4. a hard wired switched smoke alarm relay power supply conductor +VE (REL). This conductor is used to energies and to operate the smoke alarm relay REL when the smoke alarm is tested remotely so as to close its normally open relay contact RC connected across the normally open contact of the smoke alarm momentary action push to test switch TS.

A Control Panel CP connected to a battery backed extra low voltage power supply PS, derived from mains power supply, by a 2-core cable comprising of the +VE and the −VE power supply conductors. The Control Panel CP is also connected to each of the system's interconnected smoke alarms by individual 4-core cables comprising of conductors +VE, −VE, INT and +VE (REL) as previously described above.

Referring to FIG. 18, each of the interconnected smoke alarm light emitting diode LED operates when the smoke alarm current through resistor R2 causes sufficient voltage to be developed to turn on the PNP bipolar transistor Q1. This condition is satisfied when the smoke alarm draws a higher than quiescent current when it is activated to provide the audible fire warning in alarm mode, in test mode, or when the smoke alarm receives a signal via the hard wired interconnect wiring due to another interconnected smoke alarm being in alarm or test mode.

It is to be noted that with the fourth embodiment of the invention, each of the system's interconnected smoke alarms can be tested by either operating its normally open push to test switch at the smoke alarm, or by operating the remote smoke alarm test switch RTS at the system's Control Panel CP.

As PNP bipolar transistor Q1 turns on, capacitor C1 of the smoke alarm is charged via resistor R3 and this voltage is applied to the Gate of FET transistor Q2. When the voltage applied to the Gate of transistor Q2 reaches approximately 2 volts, the transistor turns on and current flows through the smoke alarm light emitting diode LED, which also turns on.

At the end of the test mode or the alarm mode, all the system's smoke alarms return to their quiescent mode to result in the quiescent current of each smoke alarm through their respective Resistors R2 being insufficient to turn on bipolar transistors Q1 of each of the interconnected smoke alarm. Under these conditions, each of the interconnected smoke alarm capacitor C1 rapidly discharges through Resistor R4 and transistor Q2 is turned off and the smoke alarm light emitting diode LED is turned off.

Referring to FIG. 18, the individual INT conductors of all of the system's interconnected smoke alarms are electrically connected together at the Control Panel CP for common alarm communication between all interconnected smoke alarms when any of the system's smoke alarms is in alarm mode or is being tested.

Also referring to FIG. 18, the remote smoke alarm test switch RTS of each smoke alarms can be either a momentary action normally open push to test switch, or an ON and OFF switch which can be turned on when the smoke alarm is tested. The description of the testing of the smoke alarms of this fourth embodiment of the invention assumes that the smoke alarms remote test switches RTS are of the momentary action normally open type.

With the fourth embodiment of the invention, the smoke detection and warning functions of each of the system's interconnected smoke alarms SA1, SA2 and SA3 are fully tested at a remote location by:

(a) a single person operating the Control Panel CP remote momentary action push to test switch RTS of one of the system's interconnected smoke alarms so that the smoke alarm is in test mode, provides an audible fire warning, and the higher smoke alarm current when activated causing the smoke alarm light emitting diode LED, located at the Control Panel CP, to operate.

(b) the single person maintaining the interconnected smoke alarm in test mode by continuing to operate its remote momentary action push to test switch RTS, at the Control Panel CP, until all the Control Panel CP light emitting diodes LED also operate to indicate that all the remaining interconnected smoke alarms have also activated and are each providing a fire warning; and (c) the single person terminating the testing of the interconnected smoke alarm by releasing the pressure on the test switch of the smoke alarm to cause the Capacitor C1 of each of the system's smoke alarms to rapidly discharge through the respective resistor R4 of each smoke alarm to turn off all the Control Pane CP light emitting diodes LED; and (d) the single person repeating all the previously described actions and verifications for each of the remaining interconnected smoke alarms when they are tested in turn, one at a time, to result in all the detection and warning functions of all of the system's smoke alarms being fully tested and proven.

It is to be noted that with the fourth embodiment of the invention, all the light emitting diodes LED of the Control Panel CP must operate when a smoke alarm is tested for the test to be successful. Failure of any light emitting diodes of the Control Panel CP to operate when any smoke alarm is tested by operating its remote test switch RTS at the Control Panel would indicate a smoke alarm or smoke alarm wiring and/or Control Panel fault.

Figure 19:
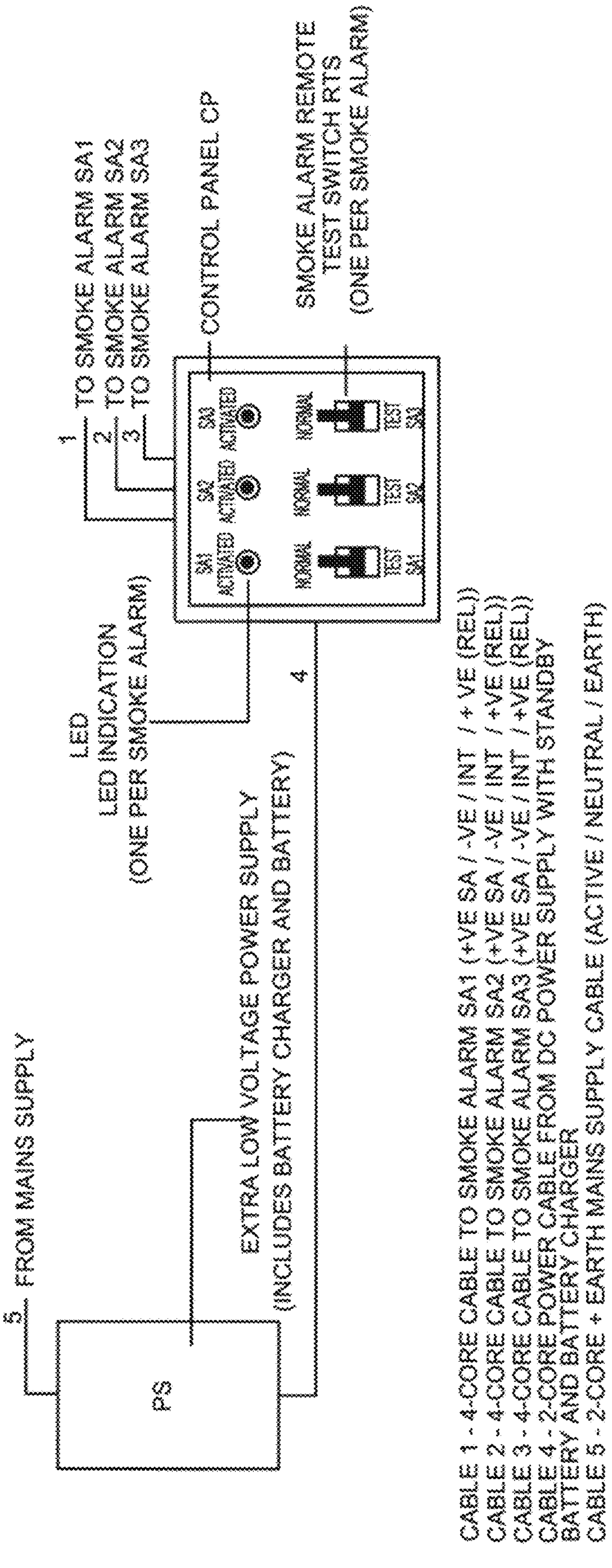
FIG. 19 is a block diagram of the interconnected smoke alarm system wired as per FIG. 18.

FIG. 19 is a block diagram of the interconnected smoke alarm system wired as per FIG. 18 and shows how the system's Control Panel CP could be configured. Referring to FIG. 19, and for an interconnected smoke alarm system as depicted by FIG. 18 previously described, the Control Panel CP would have three smoke alarm remote test switches RTS and three smoke alarm activated light emitting diode LED.

It is to be noted that the previously described third embodiment includes smoke alarms with hard wired interconnections. Another version of the third embodiment includes smoke alarms with wireless interconnections as depicted by FIG. 20 and FIG. 21.

Figure 20:
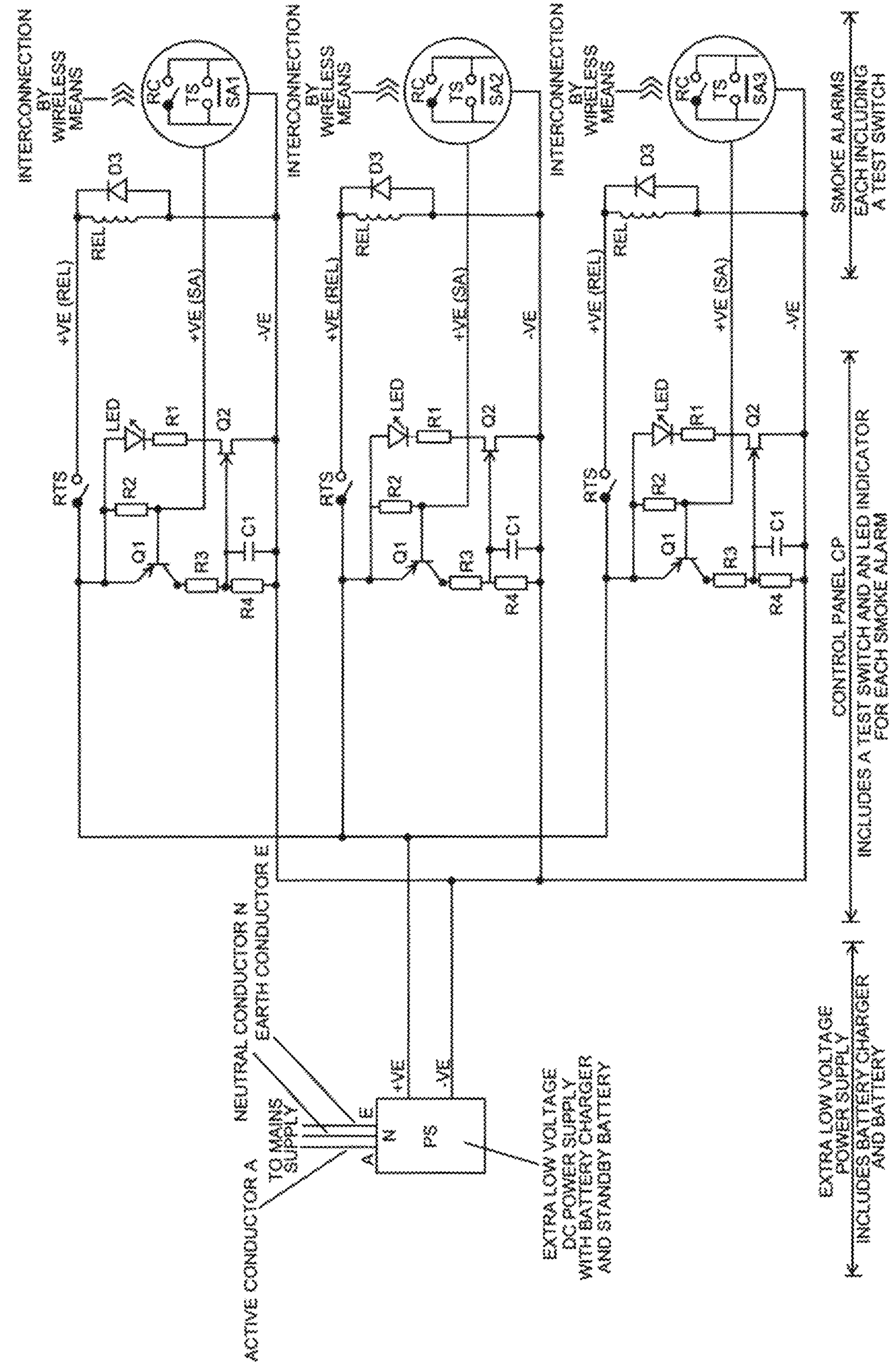
FIG. 20 is a wiring diagram for a smoke alarm system that includes three interconnected smoke alarms with wireless interconnections, and which are able to be fully tested by a single person.
Figure 21:
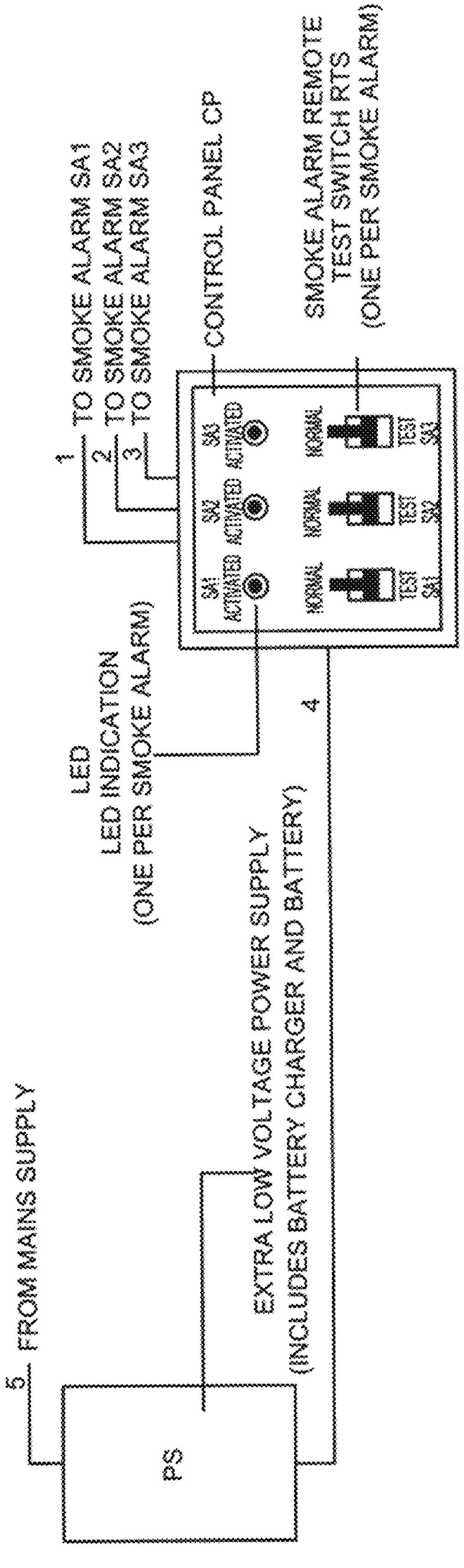
FIG. 21 is a block diagram of the interconnected smoke alarm system wired as per FIG. 20.

Referring to FIG. 20, which is the wiring diagram for a smoke alarm system comprising of three interconnected smoke alarms with wireless interconnections, and which are able to be fully tested by a single person, the smoke alarm system including:

Three interconnected smoke alarms SA1, SA2, and SA3, each with an additional smoke alarm relay REL having normally open relay contact RC connected in parallel with the usual normally open contact of the momentary action smoke Alarm push to test switch TS. With this arrangement, each of the system's interconnected smoke alarms can be tested by either operating the smoke alarm push to test switch TS locally, or by operating the smoke alarm relay REL remotely by operating a normally open remote smoke alarm test switch RTS. When the remote smoke alarm test switch RTS is operated, it has the same result as when the smoke alarm local momentary action push to test switch TS is operated as the relay contact RC is connected in parallel with the contact of switch TS.

A diode D3 across the coil of each of the system's interconnected smoke alarm relay REL is for the protection of the smoke alarm electronic circuit from damage by back e.m.f. when the smoke alarm relays are de-energised.

A 3-core cable, one for each of the system's interconnected smoke alarms connecting each smoke alarm to a Control Panel CP, the 3-core cable including the following conductors:

5. a hard wired smoke alarm-VE power supply conductor.
6. a hard wired smoke alarm +VE power supply conductor.
7. a hard wired switched smoke alarm relay power supply conductor +VE (REL). This conductor is used to energies and to operate the smoke alarm relay REL when the smoke alarm is tested remotely so as to close its normally open relay contact RC connected across the normally open contact of the smoke alarm momentary action push to test switch TS.

A Control Panel CP connected to a battery backed extra low voltage power supply PS, derived from mains power supply, by a 2-core cable comprising of the +VE and the −VE power supply conductors. The Control Panel CP is also connected to each of the system's interconnected smoke alarms by individual 3-core cables comprising of conductors +VE, −VE, and +VE (REL) as previously described above. No interconnect wiring is required as the three smoke alarms SA1, SA2, and SA3 are all interconnected by wireless means.

Referring to FIG. 20, each of the interconnected smoke alarm light emitting diode LED operates when the smoke alarm current through resistor R2 causes sufficient voltage to be developed to turn on the PNP bipolar transistor Q1. This condition is satisfied when the smoke alarm draws a higher than quiescent current when it is activated to provide the audible fire warning in alarm mode, in test mode, or when the smoke alarm receives a wireless interconnection signal due to another interconnected smoke alarm being in alarm or test mode.

It is to be noted that, as for the fourth embodiment of the invention, with this version of the embodiment each of the system's interconnected smoke alarms can be tested by either operating its normally open push to test switch at the smoke alarm, or by operating the remote smoke alarm test switch RTS at the system's Control Panel CP.

As PNP bipolar transistor Q1 turns on, capacitor C1 of the smoke alarm is charged via resistor R3 and this voltage is applied to the Gate of FET transistor Q2. When the voltage applied to the Gate of transistor Q2 reaches approximately 2 volts, the transistor turns on and current flows through the smoke alarm light emitting diode LED, which also turns on.

At the end of the test mode or the alarm mode, all the system's smoke alarms return to their quiescent mode to result in the quiescent current of each smoke alarm through their respective Resistors R2 being insufficient to turn on bipolar transistors Q1 of each of the interconnected smoke alarm. Under these conditions, each of the interconnected smoke alarm capacitor C1 rapidly discharges through Resistor R4 and transistor Q2 is turned off and the smoke alarm light emitting diode LED is turned off.

Referring to FIG. 20, no interconnection wiring is required as all of the system's smoke alarms are connected by wireless means for common alarm communication between all interconnected smoke alarms when any of the system's smoke alarms is in alarm mode or is being tested.

Also referring to FIG. 20, the remote smoke alarm test switch RTS of each smoke alarms can be either a momentary action normally open push to test switch, or an ON and OFF switch which can be turned on when the smoke alarm is tested. The description of the testing of the smoke alarms of this version of the fourth embodiment of the invention assumes that the smoke alarms remote test switches RTS are of the momentary action normally open type.

With this version of the fourth embodiment of the invention, the smoke detection and warning functions of each of the system's interconnected smoke alarms SA1, SA2 and SA3 are fully tested at a remote location by:

(a) a single person operating the Control Panel CP remote momentary action push to test switch RTS of one of the system's interconnected smoke alarms so that the smoke alarm is in test mode provides an audible fire warning. The higher smoke alarm current when activated causes the smoke alarm light emitting diode LED, located at the Control Panel CP, to operate.

(b) the single person maintaining the interconnected smoke alarm in test mode by continuing to operate its remote momentary action push to test switch RTS, at the Control Panel CP, until all the Control Panel CP light emitting diodes LED also operate to indicate that all the remaining interconnected smoke alarms have also activated and are each providing a fire warning; and (c) the single person terminating the testing of the interconnected smoke alarm by releasing the pressure on the test switch of the smoke alarm to cause the Capacitor C1 of each of the system's smoke alarms to rapidly discharge through the respective resistor R4 of each smoke alarm to turn off all the Control Pane CP light emitting diodes LED; and (d) the single person repeating all the previously described actions and verifications for each of the remaining interconnected smoke alarms when they are tested in turn, one at a time, to result in all the detection and warning functions of all of the system's smoke alarms being fully tested and proven.

As with the fourth embodiment including smoke alarms with hard wired interconnections, this version of the fourth embodiment using smoke alarms with wireless interconnections, all the light emitting diodes LED of the Control Panel CP must operate when a smoke alarm is tested for the test to be successful. Failure of any light emitting diode of the Control Panel CP to operate when any smoke alarm is tested by operating its remote test switch RTS at the Control Panel would indicate a smoke alarm fault, or a smoke alarm wiring fault and/or a Control Panel fault.

FIG. 21 is a block diagram of the interconnected smoke alarm system wired as per FIG. 20 and shows how the system's Control Panel CP could be configured. Referring to FIG. 21, and for an interconnected smoke alarm system as depicted by FIG. 20 previously described, the Control Panel CP would have three smoke alarm remote test switches RTS and three smoke alarm activated light emitting diode LED.

Fifth Embodiment

Figure 22:
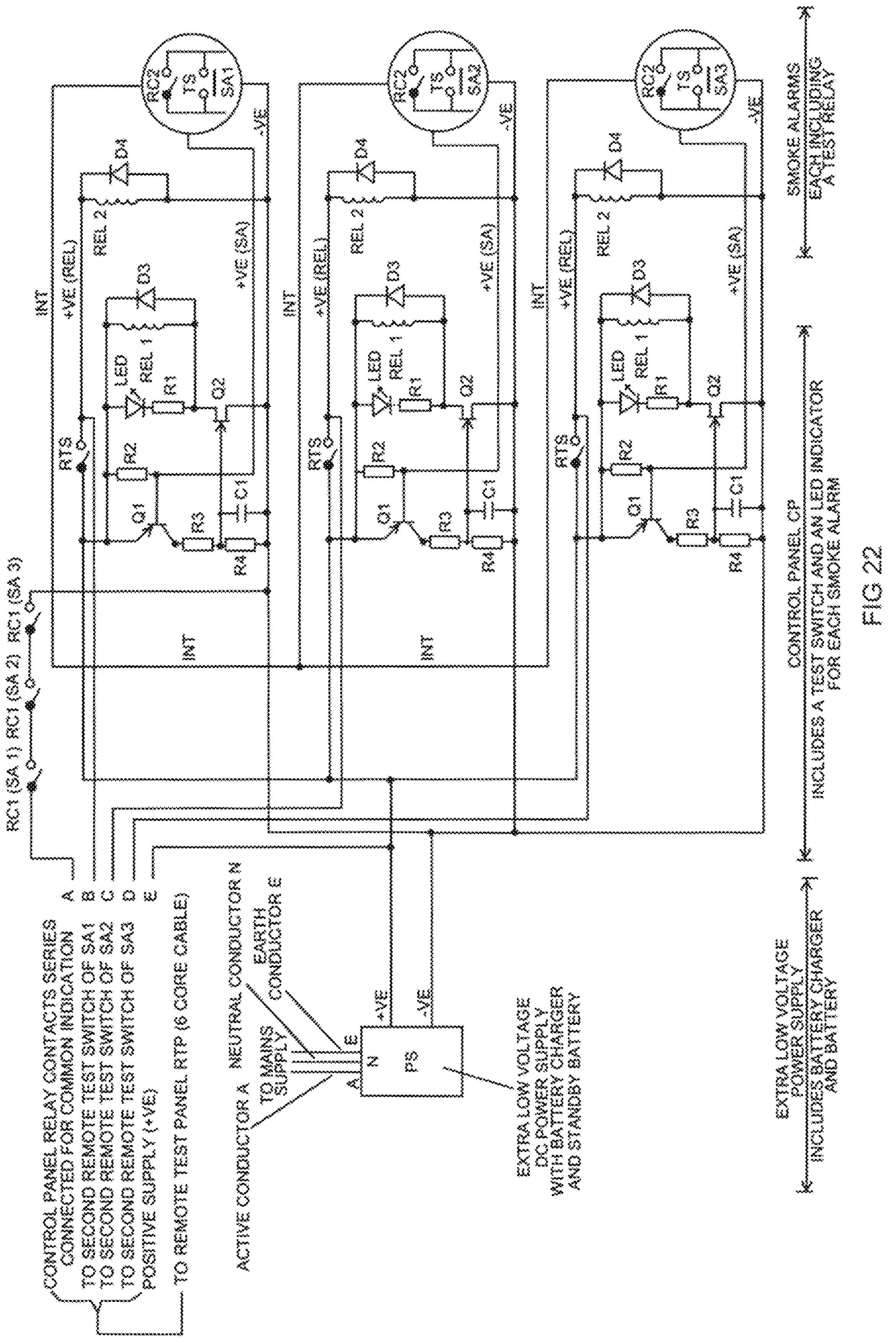
FIG. 22 is a wiring diagram for a smoke alarm system that includes three interconnected smoke alarms able to be fully tested by a single person at two remote locations.
Figure 23:
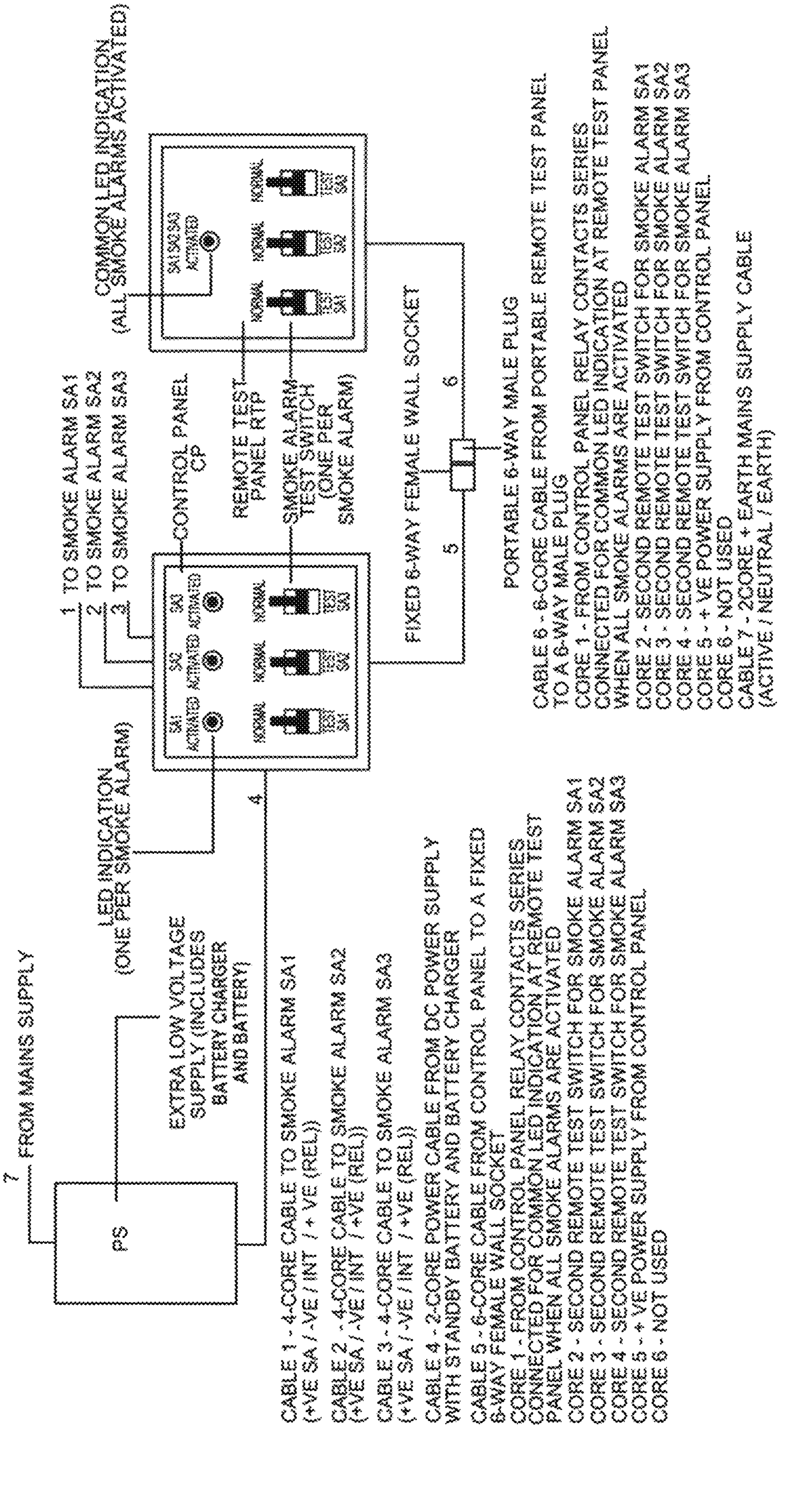
FIG. 23 is a block diagram for a smoke alarm system that includes three interconnected smoke alarms able to be fully tested by a single person at two remote locations.
Figure 24:
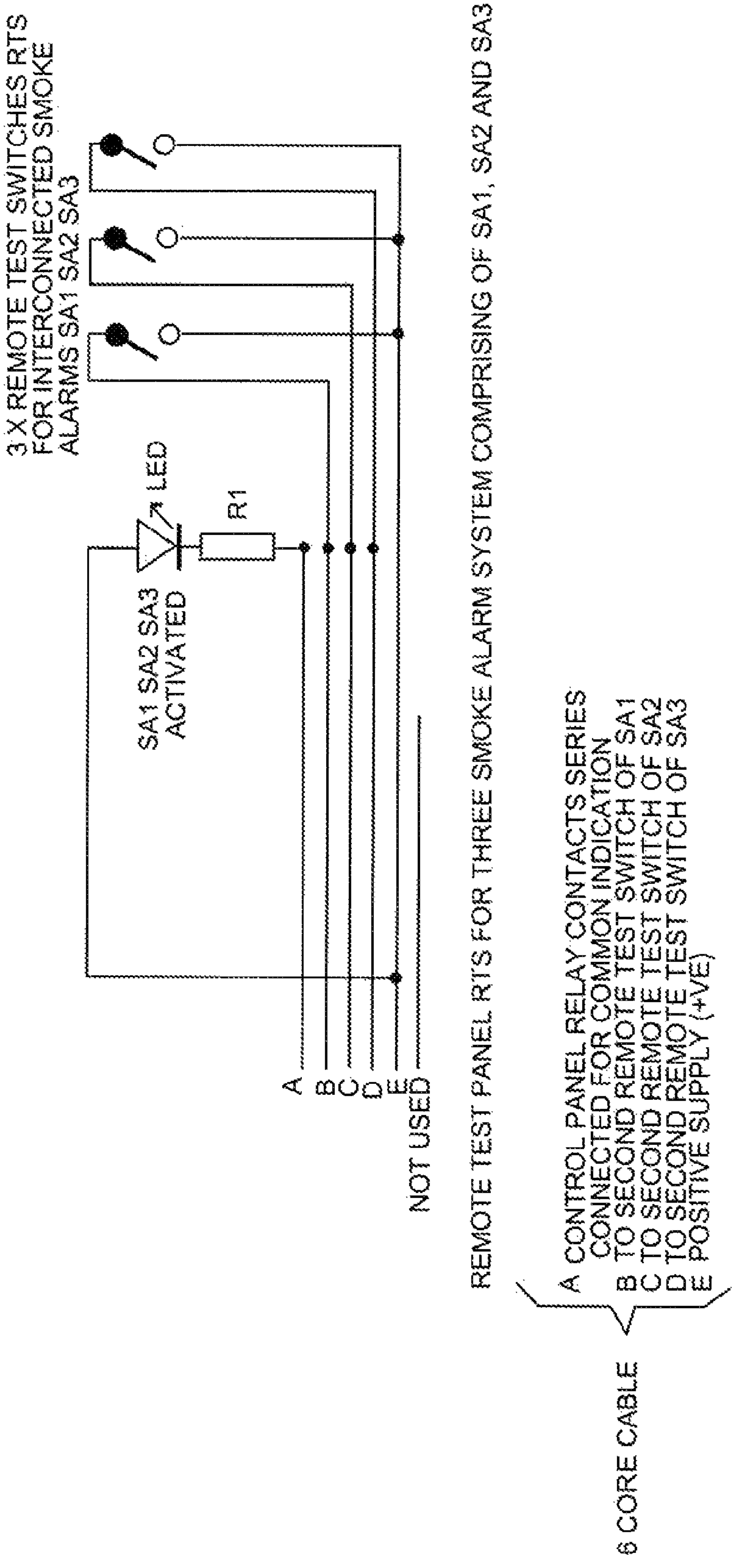
FIG. 24 is a wiring diagram for the Remote Test Panel RTS which includes a light emitting diode LED in series with Resistor R1, and three smoke alarm remote test switches RTS.

The fifth embodiment is as depicted by FIG. 22, FIG. 23 and FIG. 24, which are for a smoke alarm system comprising of three interconnected smoke alarms able to be fully tested by a single person at two remote locations, such as:

Within a single dwelling—It is advantageous for a single person to be able to fully test the detection and warning functions of all smoke alarms of a dwelling's interconnected smoke alarm system from more than one location. An example is a two-storey dwelling, in which case a single person can test all of the interconnected smoke alarms from either storey.

Leased single dwellings—For insurance purposes or for legal reasons, it is common for owners of leased single dwellings to arrange for the testing of interconnected smoke alarms, usually through the relevant Real Estate Agent, at their own cost at least once a year and when there is a tenant change. As access to leased properties is often limited, delayed or difficult to arrange, it is advantageous if in such cases the testing of the interconnected smoke alarm system is able to be performed from outside of the dwelling, for example outside at the entry door. Therefore, in these dwellings, a remote test panel could be provided inside the dwelling for use by occupants, whilst another remote test panel could be located outside the dwelling for testing of the smoke alarms, by the Real Estate Agent, without requiring access to the dwelling.

Owner occupied or leased dwellings of multi-unit residential buildings—for reasons given above for leased single dwellings it is advantageous if the testing of the interconnected smoke alarm system is able to be performed from outside of the dwelling, for example from a common area or corridor, as well as from inside the dwellings.

The wiring diagram for the interconnected smoke alarm system of the fifth embodiment is as depicted by FIG. 22, whilst FIG. 23 is a block diagram for the interconnected smoke alarm system. Referring to FIG. 23, the interconnected smoke alarm system of the fifth embodiment comprises of an extra low voltage power supply PS, a Control Panel CP, three interconnected smoke alarms SA1, SA2 and SA3 with hard wired interconnections, and a Remote Test Panel RTP. These are further described as follows:

Smoke alarms SA1, SA2 and SA3—Referring to FIG. 22, it can be seen that these smoke alarms have hard wired interconnections and are identical to those of the fourth embodiment. They include smoke alarm relays REL2, with protection diodes D4, and the relays make it possible to remotely test each individual interconnected smoke alarms when they are energised to close relay contacts RC2 connected in parallel with each of the smoke alarm push to test switch.

Extra low voltage power supply PS—Referring to FIG. 22, this power supply is derived from mains power supply and is identical to the power supply of the fourth embodiment.

Control Panel CP—Referring to FIG. 12, it can be seen that the Control Panel CP is as described for the fourth embodiment of the invention, with the following exceptions:

1. the Control Panel CP has additional relays REL1 and protection diodes D3, one of each for each of the system's interconnected smoke alarms. For each of the smoke alarms, the respective additional relay REL 2 operates when bipolar transistor Q2 turns on when the smoke alarm is tested, detects smoke, or is activated by another smoke alarm in test or alarm mode through the hard wired interconnection. It is to be noted that the additional relay REL 2 of each of the system's interconnected smoke alarms operates at the same time that the respective smoke alarm light emitting diode LED operates when a higher than quiescent smoke alarm current is detected.
2. The purpose of Control Panel CP relays is for their respective normally open contacts RC1, wired in series in accordance with FIG. 22, to provide a closed path to the −VE power supply for operating a common light emitting diode LED of the Remote Testing Panel RTP when all the system's interconnected smoke alarms are activated and are each providing an audible fire warning. Referring to FIG. 22, this is achieved by connecting one side of series connected relay contacts RC1 to the −VE power supply conductor, and the other side of the relay contacts RC1 is wired to the Remote Testing Panel as conductor A of a 6-core cable.
3. Referring to FIG. 22, the Control Panel CP also has three additional conductors B, C, and D wired back to the Remote Testing Panel RTP for remotely testing the respective interconnected smoke alarms SA1, SA2 and SA3.
4. Also referring to FIG. 22, the Control Panel CP has a further conductor E, connected to the Control Panel CP +VE power supply conductor, which is also wired back to the Remote Testing Panel RTP.
5. Conductors A, B, C, D and E form part of a 6-core cable connecting the Remote Test Panel RTS to the Control Panel CP. In accordance with FIG. 23, the Control Panel CP is wired to a fixed 6-way female wall socket and connection to the portable Remote Test Panel RTS is by way of a 6-way male plug. This arrangement is where the Remote Test Panel is to be operated outside of a single dwelling, or outside of a dwelling of a multi-unit residential building to ensure that unauthorised persons, such as children in the neighbourhood, are not able to test the smoke alarms and be a nuisance to the occupants of the dwelling. However, if the Remote Test Panel RTP is to be used within a single dwelling, for example on each floor of a two-storey dwelling, then the Remote Test Panel RTS and the wiring between the Remote Test Panel and the Control Panel CP can be hard wired and fixed, and the wall socket and plug as previously described are omitted altogether.
6. FIG. 24 is a wiring diagram for the Remote Test Panel RTS which includes a light emitting diode LED in series with Resistor R1, and three smoke alarm remote test switches RTS. The light emitting diode LED and the series Resistor R1 are connected on one side to the positive supply conductor +VE (conductor E), and conductor A which is wired back to the Control Panel CP series connected relay contacts. When all the system's interconnected smoke alarms are activated and are producing an audible fire warning, all the smoke alarm relays REL1 operate and their respective relay contacts RC1 close (FIG. 22) to cause the light emitting diode LED of the Remote Test Panel RTS to operate.

With the fifth embodiment of the invention, the smoke detection and warning functions of each of the system's interconnected smoke alarms SA1, SA2 and SA3 are fully tested at the Control Panel CP by a single person in the same way as that described for the fourth embodiment of the invention.

The smoke detection and warning functions of the system's interconnected smoke alarms SA1, SA2 and SA3 can also be fully tested at the Remote Test Panel RTS by a single person by:

(a) the single person operating the Remote Test Panel RTS momentary action push to test switch of one of the system's interconnected smoke alarms resulting in the relay REL 2 of the smoke alarm to operate and close the contact RC2 of the relay. Closure of the smoke alarm relay contact RC2 causes the smoke alarm to be tested to provide an audible fire warning. The higher smoke alarm current when activated causes the smoke alarm light emitting diode LED and relay REL 1 of the respective smoke alarm, located at the Control Panel CP, to operate.

(b) the single person maintaining the interconnected smoke alarm in test mode by continuing to operate its remote momentary action push to test switch, at the Remote Test Panel RTS, until all the Control Panel CP light emitting diodes LED and smoke alarm relays REL 1 operate to indicate that all the remaining interconnected smoke alarms have also activated and are each providing a fire warning; and (c) The operation of all of the interconnected smoke alarm relays REL1 causes all of the smoke alarm relay contacts RC1, located at the Control Panel CP, to close to operate the common light emitting diode LED at the Remote Test Panel indicating that all of the system's smoke alarms have activated and are each providing a fire warning; and (d) the single person terminating the testing of the interconnected smoke alarm at the Remote Testing Panel RTS, by releasing the pressure on the push to test switch of the smoke alarm to cause the capacitor C1 of each of the system's smoke alarms to rapidly discharge to turn off all the Control Pane CP light emitting diodes LED and the single light emitting diode LED of the Remote Testing Panel when the Control Panel relays REL 1 are de-energised; and (e) the single person repeating all the previously described actions and verifications for each of the remaining interconnected smoke alarms when they are tested in turn, one at a time, to result in all the detection and warning functions of all of the system's smoke alarms being fully tested and proven.

As with the fifth embodiment which includes smoke alarms with hard wired interconnections, another version of the fifth embodiment of the invention makes use of smoke alarms with wireless interconnections. Apart from the differences listed below, the two smoke alarm systems are identical in every aspect, including the way they are constructed and the method used for testing the detection and warning functions of the systems smoke alarms. These differences are:

All of the system's smoke alarms are interconnected by wireless means; and

No hard wired interconnection wiring is required as the system's smoke alarms are interconnected by wireless means; and The cable connecting the Control Panel CP to each of the system's smoke alarm is 3-core instead of 4-core.

Figure 25:
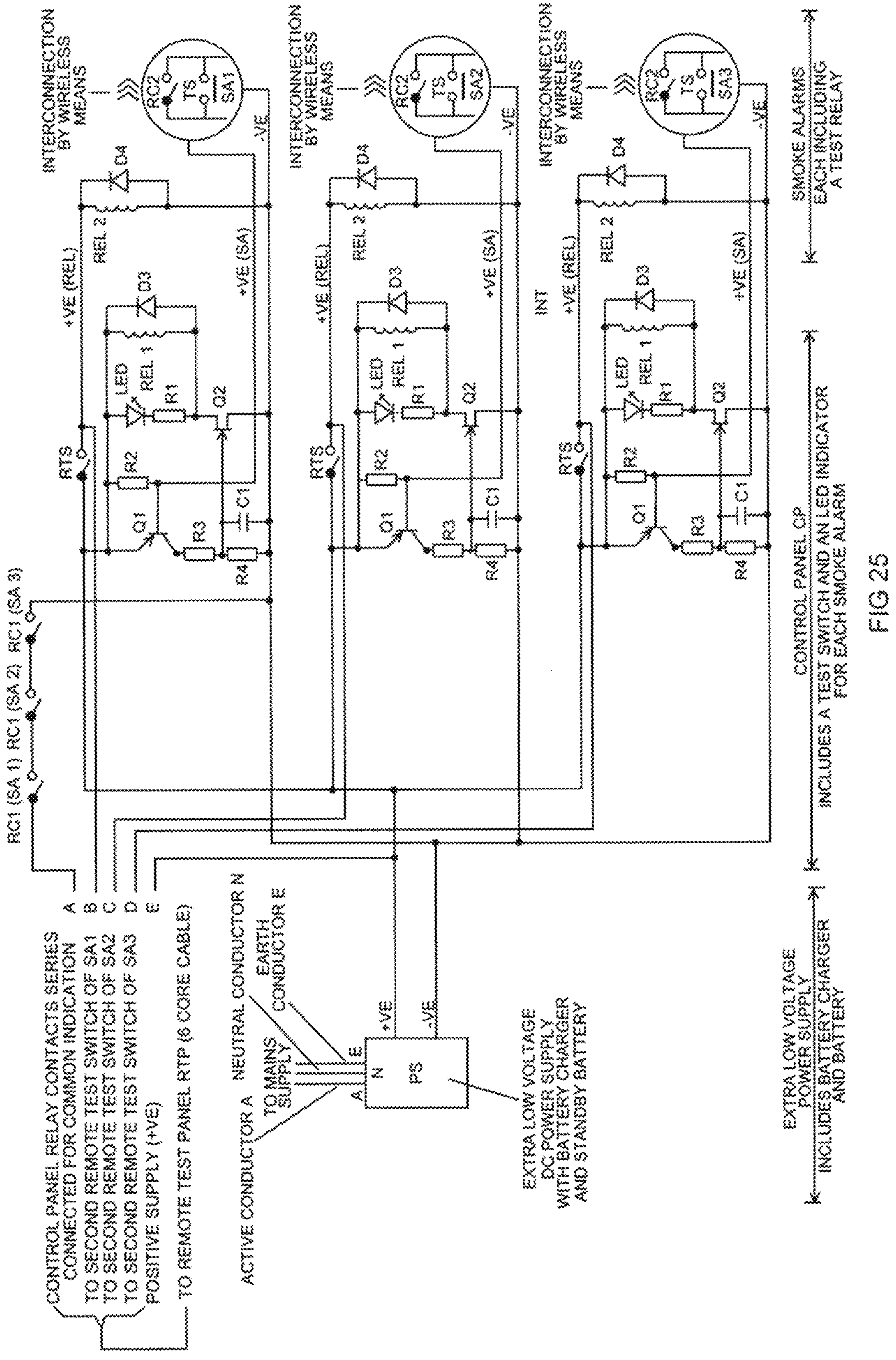
FIG. 25 is a wiring diagram for a smoke alarm system that includes three interconnected smoke alarms.

The above differences are reflected in FIG. 25 wiring diagram and FIG. 26 block diagram for this version of the fifth embodiment. FIG. 24 for the Remote Test Panel RTS of the interconnected smoke alarm system is exactly the same, with regard to of the construction and the method for testing the detection and warning functions, for the fifth embodiment of the invention and this version of the fifth embodiment.

Sixth Embodiment

Figure 27:
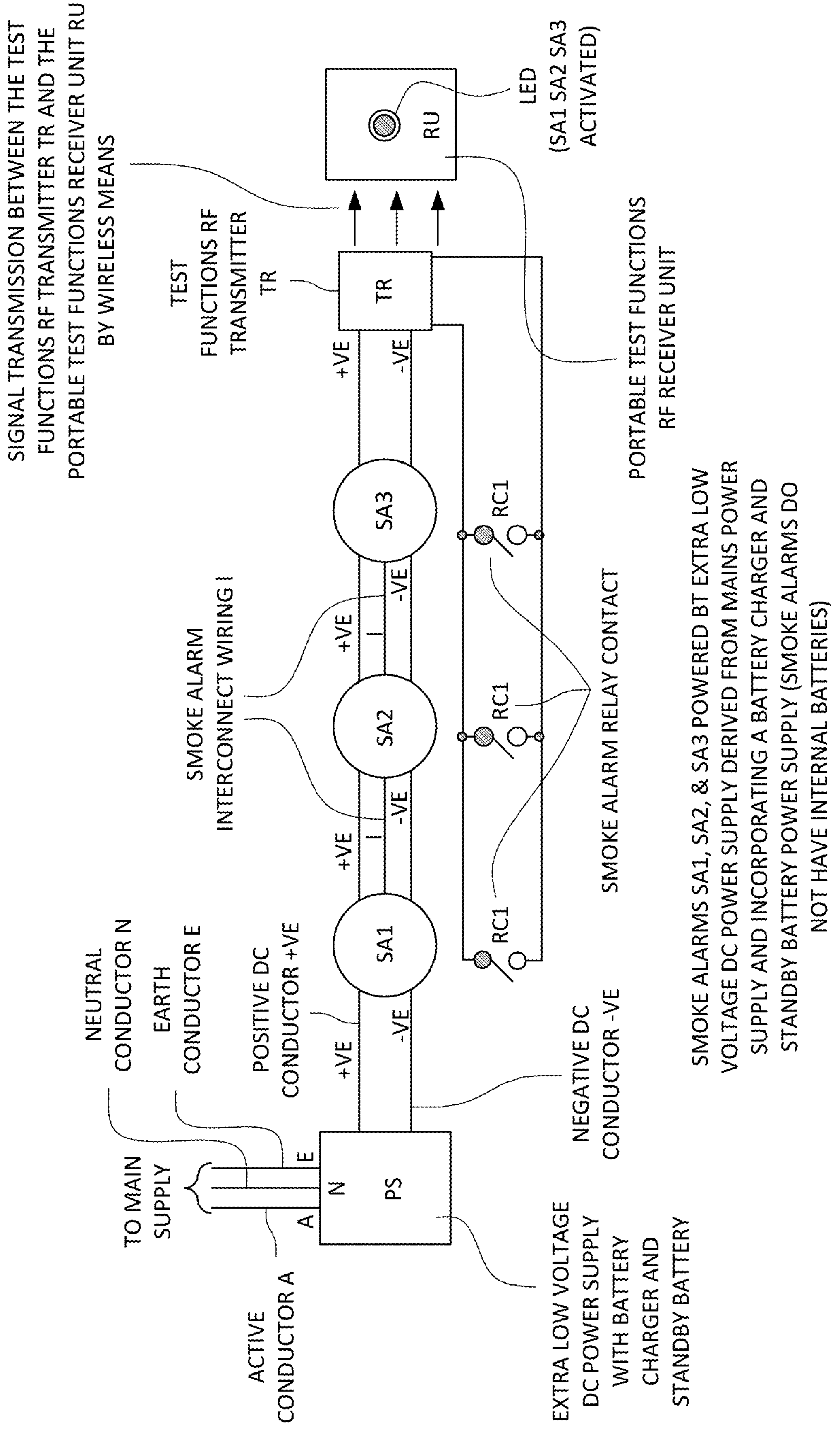
FIG. 27 is a wiring diagram for a smoke alarm system that includes three interconnected smoke alarms, smoke alarm relays, and test functions RF transmitter TR.
Figure 28:
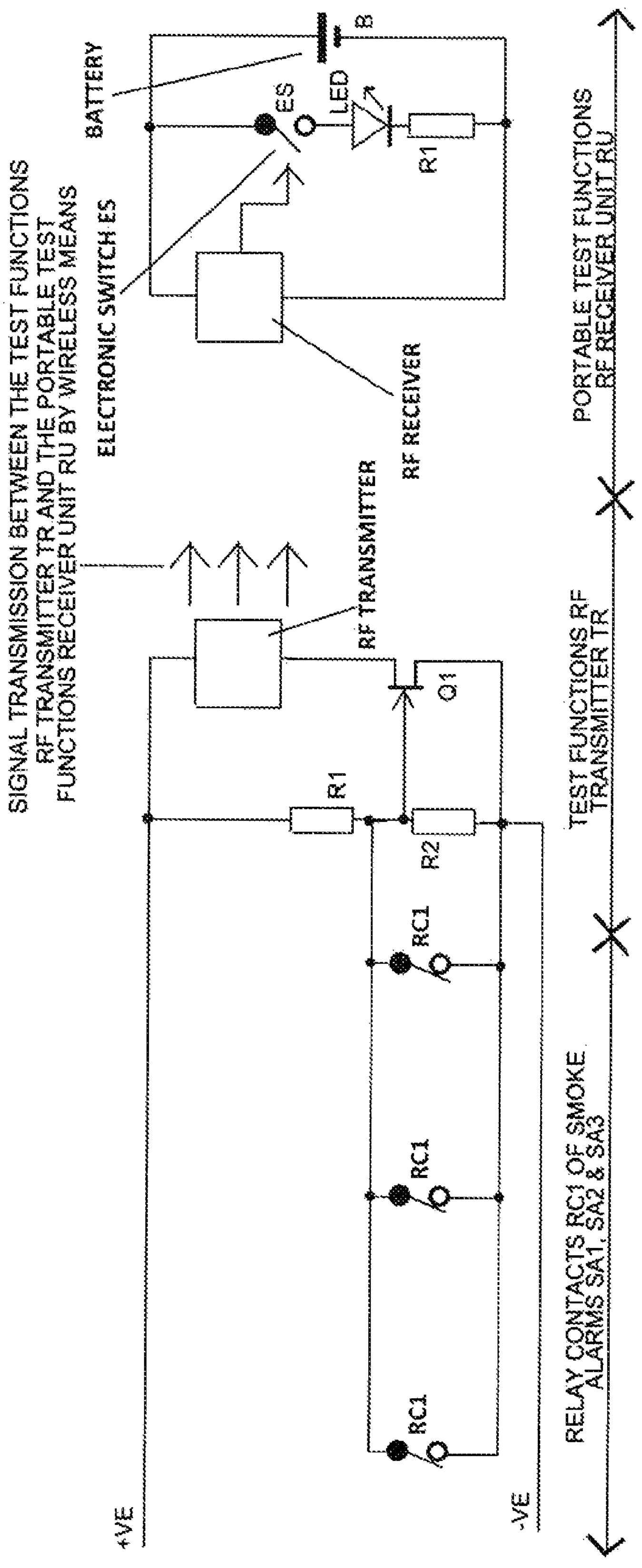
FIG. 28 is a wiring diagram of the test functions RF transmitter TR.
Figure 29:
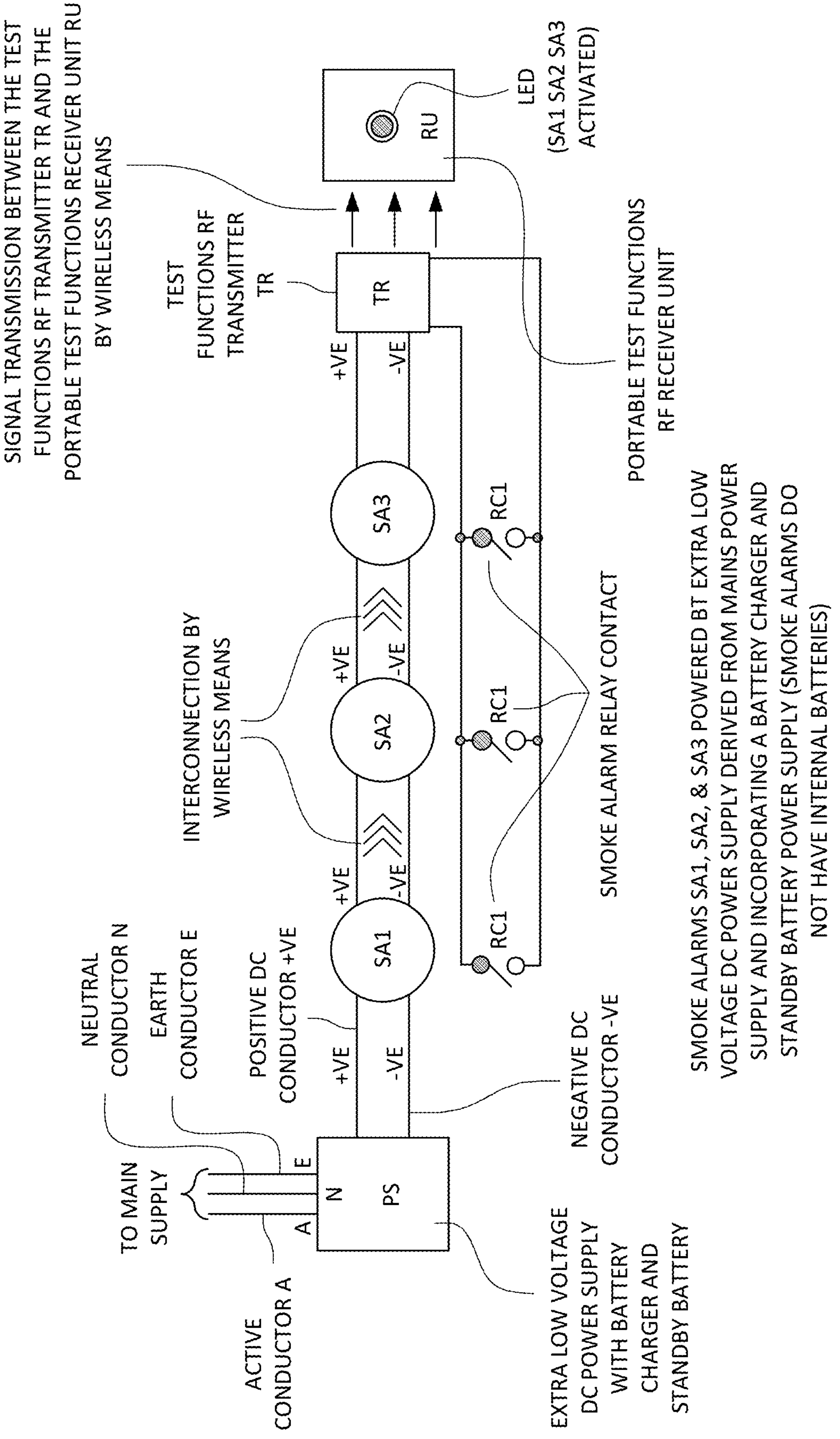
FIG. 29 is a wiring diagram for a smoke alarm system that includes three interconnected smoke alarms, smoke alarm relays, and test functions RF transmitter TR.

The sixth embodiment is as depicted by FIG. 27, FIG. 28 and FIG. 29, which are for a smoke alarm system comprising of three interconnected smoke alarms smoke alarms SA1, SA2, and SA3 hard wired to an extra low voltage power supply PS and with hard wired interconnections, a test functions RF transmitter TR also hard wired to the extra low voltage power supply, and a standalone portable test functions receiver unit powered by its own internal battery. A detailed description of the sixth embodiment is the following sections of this specifications.

Referring to FIG. 27, which is a wiring diagram for the smoke alarm system of the sixth embodiment, the smoke alarm system comprises of:

Smoke alarms SA1, SA2 and SA3—Referring to FIG. 27, it can be seen that these smoke alarms have hard wired interconnections I and are hard wired to a power supply PS by conductors +VE and −VE, with each interconnected smoke alarm having the usual momentary action push to test switch.

Smoke alarm relays—As for the fourth embodiment, each interconnected smoke alarm includes a relay which operates when a higher smoke alarm current is detected when the smoke alarm is activated. This condition is satisfied when the smoke alarm is in test mode or in alarm mode, or when the smoke alarm is activated upon receipt of a signal, on the interconnect hard wiring, when another interconnected smoke alarm is in test mode or in alarm mode.

Referring to FIG. 27, each of the interconnected smoke alarm relay has a normally closed relay contact RC1, and the relay contacts are hard wired to a test functions RF transmitter TR.

Test functions RF transmitter TR—Referring to FIG. 27, the test functions RF transmitter TR is hard wired to the power source by conductors +VE and −VE, and to the relay contacts RC1 of each of the interconnected smoke alarms. The purpose of the test functions RF transmitter TR is to provide a wireless signal, for example an RF signal, to the portable test functions RF receiver unit RU when all of the system's smoke alarms have activated and their respective normally closed relay contacts RC1 are open. The operation of the portable test functions RF receiver unit is described further below in the specification.

Referring to FIG. 28, which a wiring diagram of the test functions RF transmitter TR, it can be seen that, under quiescent conditions when the smoke alarms are not activated and all the smoke alarm relay contacts RC1 are closed, the Gate of FET transistor Q1 is grounded and the minimum of around 2 volts at the Gate to turn the transistor on is not achieved. Therefore, the transistor is turned off and no RF signal is transmitted by the RT transmitter. As the RC1 relay contacts of the smoke alarms are all wired in parallel, the grounding of the Gate of FET transistor Q1 only ceases when all of the smoke alarm RC1 contacts are open as a result of all the systems interconnected smoke alarms being activated. The values of resistors R1 and R2 connected in series across the power supply ensure that more than 2 volts are applied to the Gate of FET transistor Q1 when all the relay contacts RC1 of the smoke alarms are closed.

When the voltage applied to the gate of FET transistor Q1 is 2 volts or more, the transistor turns on and the RF transmitter of the test functions RF transmitter TR operates to provide a wireless signal.

Portable test functions RF receiver unit RU—This receiver unit is a standalone portable device with its own battery B as depicted by FIG. 28. The receiver unit RU also comprises of an RF receiver which, upon receipt of a wireless signal from the test functions RF transmitter TR previously described, operates an electronic switch ES to turn on the light emitting diode LED. As the light emitting diode LED turns on, it provides an indication that all the interconnected smoke alarm relay contacts RC1 are open and that all the smoke alarms are activated.

Extra low voltage power supply PS-Referring to FIG. 27, this power supply is derived from mains power supply and is identical to the power supply of the fourth embodiment. The extra low voltage is usually around 12 V DC.

With the sixth embodiment of the invention, and referring to FIG. 27 and FIG. 28, the testing of the detection and warning functions of all of the system's smoke alarms is done by a single person by:

(a) the single person operating the momentary action push to test switch of one of the system's interconnected smoke alarms whilst holding the portable test functions receiver unit resulting in the smoke alarm activating and providing a fire warning. The activation of the smoke alarm being tested operates the smoke alarm relay and provides a signal on the hard wired interconnection wiring to activate the system's remaining interconnected smoke alarms. Thus, all of the system's smoke alarms are activated and they all provide the fire warning with all their relays also operating to open all of the system's smoke alarm relay contacts RC1; and (b) the single person maintaining the smoke alarm in test mode so that the system's test functions RF transmitter TR is turned on to provide a wireless signal as the relay contacts RC1 are closed; and (c) the single person observing that the light emitting diode LED of the portable test functions receiver unit RU operates to indicate that all of the system's smoke alarms have activated and are providing a fire warning, when the portable test functions receiver unit RU receives a wireless signal from the system's test functions RF transmitter TR causing the electronic switch ES of the portable receiver unit RU to close; and (d) the single person terminating the testing of the interconnected smoke alarm and repeating all the previously described actions and verifications for each of the remaining interconnected smoke alarms when they are tested in turn, one at a time, to result in all the detection and warning functions of all of the system's smoke alarms being fully tested and proven.

As with the sixth embodiment which includes smoke alarms with hard wired interconnections, another version of this embodiment of the invention makes use of smoke alarms with wireless interconnections. Apart from the differences listed below, the two smoke alarm systems are identical in every aspect, including the way they are constructed and the method used for testing the detection and warning functions of the systems smoke alarms. These differences are:

All of the system's smoke alarms are interconnected by wireless means; and

No hard wired interconnection wiring is required as the system's smoke alarms are interconnected by wireless means; and The system includes two wireless signals, namely one RF signal for interconnection and common alarm communication between the system's interconnected smoke alarms, and a second RF signal emitted by the RF transmitter of the test functions RF transmitter FR when all the smoke alarms are activated with the relay contacts of all interconnected smoke alarms are open. These two signals must have different frequencies for the system to work.

The above differences are reflected in FIG. 29 wiring diagram for this version of the sixth embodiment. FIG. 28 for the portable test functions RF receiver unit RU of the interconnected smoke alarm system is exactly the same, with regard to of the construction and the method for testing the detection and warning functions, for the sixth embodiment of the invention and this version of the sixth embodiment.

It is also to be noted that the sixth embodiment of this invention is not limited to using the extra low voltage power supply described for the embodiment and that the system can be powered by power supplies of any type.

The invention claimed is:

1. A method for a single person to test smoke, heat, or carbon monoxide detection and warning functions of each interconnected alarm device of an interconnected fire alarm system that enables the person to ascertain, at a location of an alarm device being tested, that all remaining interconnected alarm devices have activated, the interconnected fire alarm system including:

two or more compatible interconnected alarm devices with momentary action test switches such as smoke, heat and carbon monoxide alarms in any combination, wherein:

the interconnected alarm devices are hard wired to a power source and are interconnected by hard wiring connection or by a wireless connection;

each interconnected alarm device is configured to detect that the alarm device has activated and is providing an audible fire warning when the alarm device is tested or is in alarm mode;

each interconnected alarm device is configured to switch operations when it is detected that the alarm device has activated and is providing an audible fire warning;

the interconnected fire alarm system further includes separate signal hard wiring connections configured to connect all of the interconnected alarm devices;

each interconnected alarm devices further comprises a light emitting diode configured to provide an indication of an alarm, each light emitting diode connected to the said separate signal hard wiring connections so that the indication of the alarm of the interconnected alarm devices provided by the light emitting diode are switched on to provide an indication at each interconnected alarm device when it is detected that all of the interconnected alarm devices are activated and are each providing an audible fire warning; and the smoke, heat, or carbon monoxide detection and warning functions of each of the interconnected alarm devices are tested by a single person:

operating the momentary action test switch of one of the interconnected alarm devices so that the alarm device is in test mode;

maintaining the said interconnected alarm device in test mode by continuing to push the test switch until the light emitting diode of said interconnected alarm device indicates that all of the interconnected alarm devices have activated and are each providing a fire warning;

terminating testing of the interconnected alarm device by releasing a pressure on the momentary action test switch of said interconnected alarm device when the light emitting diode of said interconnected alarm device indicates that all of the remaining alarm devices are activated; and the single person repeating all previously described actions and verifications for each of the remaining interconnected alarm devices when they are tested in turn, one at a time, to result in the detection and warning functions of all of the interconnected alarm devices being tested and proven.

2. The method of claim 1, wherein the two or more compatible interconnected alarm devices include hard wired interconnections.

3. The method of claim 1, wherein the two or more compatible interconnected alarm devices include wireless interconnections.

4. A method to test smoke, heat, or carbon monoxide detection and warning functions of each alarm device of an interconnected fire alarm system by a single person carrying a portable standalone device that allows the person to ascertain, at a location where an alarm device is being tested, that all of remaining interconnected alarm devices have activated when the alarm device is tested, the interconnected fire alarm system including:

two or more compatible interconnected alarm devices hard wired to a power supply of any type, with each of the interconnected alarm devices having a momentary action push to test switch, wherein each of the system's alarm devices include a relay which operates when a higher alarm device current is detected when the alarm device is activated, such as when the alarm device is in test mode or in alarm mode, or when the alarm device has received a signal when another interconnected alarm device is in test mode or in alarm mode;

an RF wireless transmitter, hard wired to a power source, and connected to normally closed relay contacts of all of the interconnected alarm devices, such that the RF wireless transmitter operates and transmits a wireless RF signal when all alarm device relays are energized and their respective normally closed relay contacts open; and a standalone portable battery-operated RF receiver unit which, upon receipt of a wireless signal from the RF wireless transmitter previously described, operates an electronic switch to turn on a light emitting diode to indicate that all the interconnected alarm devices have activated and are providing a fire warning;

wherein the smoke, heat or carbon monoxide detection and warning functions of all of the system's alarm devices are tested by:

the single person operating the momentary action push to test switch of one of the interconnected alarm devices whilst holding the standalone portable battery-operated RF receiver unit resulting in the alarm device alarm activating and providing a fire warning;

the activation of the system's alarm devices resulting in all the alarm device relays to operate to open their respective normally closed contacts to turn on the RF wireless transmitter;

the single person verifying that the light emitting diode LED of the standalone portable battery-operated RF receiver operates to indicate that all of the system's alarm devices have activated and are providing a fire warning, when the standalone portable battery-operated RF receiver unit receives a wireless signal from the RF wireless transmitter to cause its electronic switch to close and turn on the light emitting diode; and the single person terminating testing of the interconnected alarm device and repeating all previously described actions and verifications for each of the remaining interconnected alarm devices when they are tested in turn, one at a time, to result in all the detection and warning functions of all of the system's alarm devices being tested and proven.

5. The method of claim 4, wherein the two or more compatible interconnected alarm devices include hard wired interconnections.

6. The method of claim 4, wherein the two or more compatible interconnected alarm devices include wireless interconnections.

7. An interconnected fire alarm system including:

two or more compatible interconnected alarm devices hard wired to a power supply of any type, with each of the interconnected alarm devices having a momentary action push to test switch, wherein each of the interconnected alarm devices include a relay which operates when a higher alarm device current is detected when an alarm device is activated, when the alarm device is in test mode or in alarm mode, or when the alarm device has received an interconnection signal when another interconnected alarm device is in test mode or in alarm mode;

an RF wireless transmitter, hard wired to a power source, and connected to normally closed relay contacts of all of the interconnected alarm devices, such that the RF wireless transmitter operates and transmits a wireless RF signal when all alarm device relays are energized and their respective normally closed relay contacts open; and a standalone portable battery-operated RF receiver which, upon receipt of a wireless signal from the RF wireless transmitter previously described, operates an electronic switch to turn on a light emitting diode to indicate that all the interconnected alarm devices have activated and are providing a fire warning.

8. The interconnected fire alarm system of claim 7, wherein the two or more compatible interconnected alarm devices include hard wired interconnections.

9. The interconnected fire alarm system of claim 7, wherein the two or more compatible interconnected alarm devices include wireless interconnections.

* * * * *